United States Patent

Kouketsu et al.

[11] Patent Number: 6,112,721
[45] Date of Patent: Sep. 5, 2000

[54] FUEL INJECTION DEVICE

[75] Inventors: Susumu Kouketsu; Hitoshi Yokomura; Keiki Tanabe, all of Tokyo, Japan

[73] Assignee: Mitsubishi Jidosha Kogyo Kabushiki Kaisha, Tokyo, Japan

[21] Appl. No.: 09/066,452

[22] PCT Filed: Jul. 31, 1997

[86] PCT No.: PCT/JP97/02667

§ 371 Date: Apr. 28, 1998

§ 102(e) Date: Apr. 28, 1998

[87] PCT Pub. No.: WO98/09068

PCT Pub. Date: Mar. 5, 1998

[30] Foreign Application Priority Data

Aug. 29, 1996 [JP] Japan ................................ 8-229012

[51] Int. Cl.⁷ .................................................. F02M 33/04
[52] U.S. Cl. ........................ 123/447; 123/506; 123/467
[58] Field of Search ................................. 123/447, 467, 123/446, 506, 496

[56] References Cited

U.S. PATENT DOCUMENTS

| | | | |
|---|---|---|---|
| 4,440,134 | 4/1984 | Nakao et al. | 123/447 |
| 5,517,972 | 5/1996 | Stockner | 123/496 |
| 5,642,714 | 7/1997 | Buckley | 123/447 |
| 5,732,679 | 3/1998 | Takahasi et al. | 123/447 |

FOREIGN PATENT DOCUMENTS 6-93936   4/1994   Japan .

*Primary Examiner*—Thomas N. Moulis

[57] ABSTRACT

A fuel injection system that can be used in a diesel engine is provided. The system includes a first accumulator for storing high-pressure fuel and a second accumulator for storing low-pressure fuel sufficiently lower in pressure than the fuel stored in the first accumulator. There is a first two-way electromagnetic valve disposed in a first fuel passage connecting the first accumulator with a fuel injection nozzle. A flow control apparatus controls a flow rate of fuel passing through a second fuel passage connecting a downstream side of the first two-way electromagnetic valve in the first fuel passage with the second accumulator. The flow control apparatus is placed in the second fuel passage. A second two-way electromagnetic valve is placed in a third fuel return passage which connects the fuel injection nozzle with a fuel tank. The second two-way electromagnetic valve switches the fuel injection modes of the fuel from its injection mode to its uninjection mode or vice versa. Also, there is provided a control device for controlling both the first two-way electromagnetic valve and the second two-way electromagnetic valve so that they open and close in response to operating conditions of the engine.

24 Claims, 11 Drawing Sheets

FIG. 2(a)
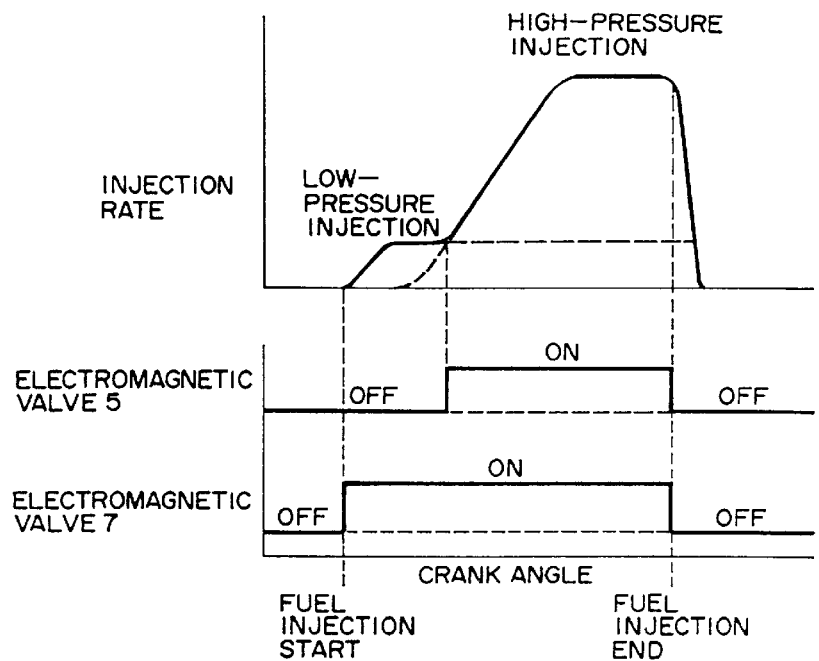
FIG. 2(b)
FIG. 3
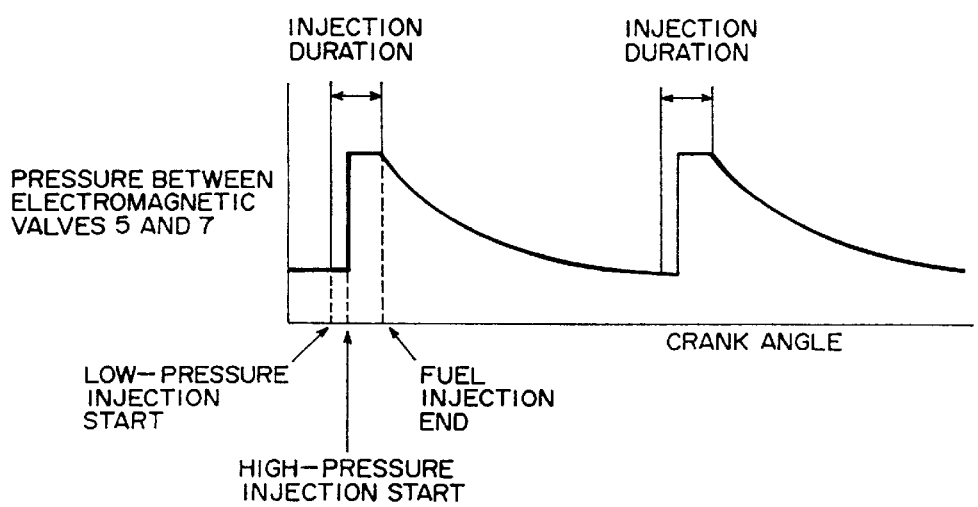

F I G. 7
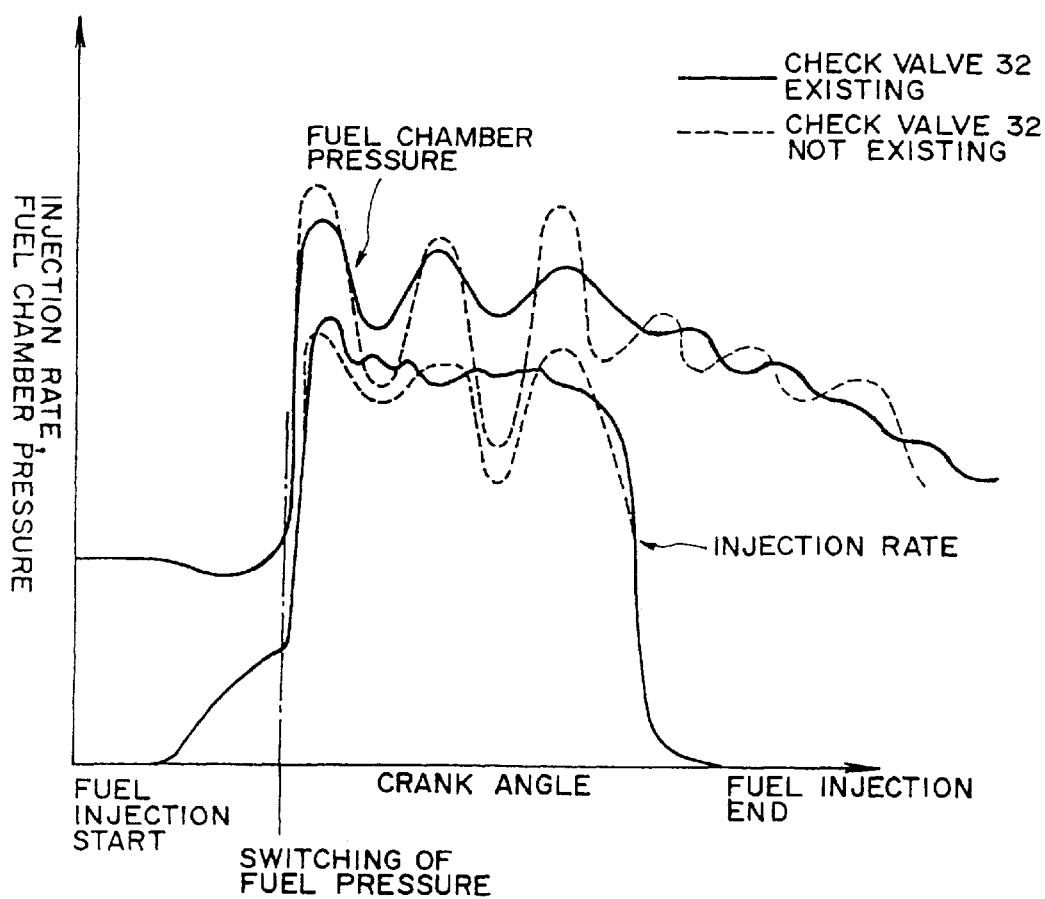

FUEL INJECTION DEVICE

This application is the national phase under 35 U.S.C. §371 of prior PCT International Application No. PCT/JP97/02667 which has an International filing date of Jul. 31, 1997 which designated the United States of America, the entire contents of which are hereby incorporated by reference.

TECHNICAL FIELD

The present invention relates to a fuel injection system that can be used in a diesel engine.

BACKGROUND ART

Heretofore, as one of fuel injection systems for a diesel engine, a common rail fuel injection system (i.e., accumulator-type fuel injection system) has been developed. In the common rail fuel injection system, high-pressure fuel pressurized by a fuel pump is accumulated in a common rail (i.e., accumulator), and an electromagnetic valve disposed in a fuel injection nozzle is so controlled as to open and close a needle valve disposed in the fuel injection nozzle, which makes it possible to achieve the control in fuel injection.

For example, Japanese Patent Laid-Open No. Hei 6-93936 discloses an accumulator-type fuel injection system, which is shown in FIG. 12. Now, with reference to FIG. 12, an example of the common rail fuel injection system will be described. In the common rail fuel injection system, there are provided: a high-pressure common rail (hereinafter referred to as the high-pressure accumulator or high-pressure fuel accumulator) 103 for storing high-pressure fuel therein; and, a low-pressure common rail (hereinafter referred to as the low-pressure accumulator or low-pressure fuel accumulator) 104 for storing low-pressure fuel therein.

Supplied to the high-pressure accumulator 103 of these accumulators is the fuel having been pressurized to a predetermined value by a high-pressure fuel pump 101, while supplied to the low-pressure accumulator 104 is the fuel having been pressurized by the high-pressure pump 101 and having passed through a pressure-regulating valve (i.e., regulator) 118 to decrease in pressure.

Further, provided in a downstream side of the low-pressure accumulator 104 is a three-way electromagnetic valve (i.e., second three-way electromagnetic valve ) 107. Connected with this second three-way electromagnetic valve 107 are: a fuel passage 110b from the above-mentioned low-pressure accumulator 104; a fuel passage 110a from the high-pressure accumulator 103; and, a communication passage 110d communicating with a fuel chamber 112 of a fuel injection nozzle (i.e., injector) 109.

This second three-way electromagnetic valve 107 is so constructed as to be subjected to a switching control for selectively supplying the high-pressure fuel from the high-pressure accumulator 103 and the low-pressure fuel from the low-pressure accumulator 104 to the fuel chamber 112 of the injector 109. Incidentally, in this case, when the second three-way electromagnetic valve 107 is held closed (i.e., held in its OFF position), the fuel passages 110b and 110d are communicated with each other to permit the low-pressure fuel to be supplied from the low-pressure accumulator 104 to the fuel chamber 112. On the other hand, when the second three-way electromagnetic valve 107 is held open (i.e., held in its ON position), the fuel passages 110a and 110d are communicated with each other to permit the high-pressure fuel to be supplied to the fuel chamber 112, which stops the supply of the low-pressure fuel.

Further, as shown in FIG. 12, in this injector 109, there is provided a three-way electromagnetic valve (i.e., first three-way electromagnetic valve) 105 for controlling the fuel injection. As shown in the drawing, connected with this first three-way electromagnetic valve 105 are: a fuel passage 110a from the high-pressure accumulator 103; a fuel return passage 110c; and, a fuel passage 110e communicating with a control chamber 111 of the injector 109.

And, the first three-way electromagnetic valve 105 is so constructed as to be subjected to a switching control for: supplying the high-pressure fuel from the high-pressure accumulator 103 to the control chamber 111 of the injector 109; and, discharging the high-pressure fuel, which has been supplied to this control chamber 111, into a fuel tank 117.

In this case, this first three-way electromagnetic valve 105 is adapted to: connect the fuel passage 110a from the high-pressure accumulator 103 with the control chamber 111 when a control signal from a controller 108 described later is OFF; and, connect the control chamber 111 with the fuel return passage 110c when the control signal from the controller 108 is ON.

On the other hand, provided in this control chamber 111 is a hydraulic piston 114 which is in abutting engagement with a needle valve 113 of the injector 109. In operation, this hydraulic piston 114 is controlled by the high-pressure fuel which is supplied to the control chamber 111 through the above-mentioned fuel passage 110e. When the hydraulic piston 114 moves down to urge the needle valve 113 downward, an injection hole of the nozzle's front end is closed by the needle valve 113 to prevent the fuel from being injected.

Further, a check valve 106 and an orifice (i.e., throttle) 115 both communicating with the fuel passage 110e extending to this control chamber 111 are connected in parallel with each other. When the first three-way electromagnetic valve 105 is held in its OFF position, the high-pressure fuel from the high-pressure accumulator 103 is promptly supplied into the control chamber 111 mainly through the check valve 106. On the other hand, when the first three-way electromagnetic valve 105 is held open, the high-pressure fuel within the control chamber 111 is drained through the orifice 115 at a relatively slow rate.

Further, in this common rail fuel injection system, there is provided the controller (i.e., ECU) 108. The controller 108 is adapted to receive engine's rotation speed information Ne, fuel pressue information $P_{HP}$ in the high-pressure accumulator 103, fuel pressure information $P_{LP}$ in the low-pressure accumulator 104, accelerator's opening angle information Acc and like information. In the controller 108, based on these pieces of information Ne, $P_{HP}$, $P_{LP}$, Acc, control signals for controlling the electromagnetic valves 105, 107 and the regulator 118 in operation are prepared and issued to these valves 105, 107 and the regulator 118.

In such a common rail fuel injection system, when the fuel injection is not performed, the controller 108 controls both the first three-way electromagntic valve 105 and the second three-way electromagnetic valve 107 so as to held them in their OFF positions. Due to this, the low-pressure fuel from the low-pressure accumulator 104 is supplied to the fuel chamber 112 of the injector 109, and the fuel under high pressure is supplied to the control chamber 111 of the injector 109 through the check valve 106.

In this case, since the high-pressure fuel acts on the hydraulic piston 114 of the control chamber 111, the hydraulic piston 114 is forced to move down. Consequently, the needle valve 113 abutting against this hydraulic piston 114 is also forced to move down to close the injection hole of the injector 109, which prevents the fuel from being injected.

When the fuel is injected, at first, only the first three-way electromagnetic valve 105 is so switched as to be held in its ON position. Due to this, the high-pressure fuel in the fuel chamber 111 is gradually drained through the orifice 115, and the needle valve 113 is opened under the influence of the fuel pressure in the fuel chamber 112 to start the fuel injection.

After that, while holding the first three-way electromagnetic valve 105 in its ON position, an operation for switching the second three-way electromagnetic valve 107 so as to hold it in its ON position is performed. Due to this, the high-pressure fuel is supplied to the fuel chamber 112 of the injector 109, so that the fuel injection of such high-pressure fuel is performed.

When the fuel injection comes to the finish, both the first three-way electromagnetic valve 105 and the second three-way electromagnetic valve 107 are held in their OFF positions, which permits the high-pressure fuel to be supplied into the control chamber 111 through the check valve 106, so that the needle valve 113 is promptly moved down to stop the fuel injection. Further, during such downward stroke of the needle valve 113, the low-pressure fuel is supplied into the fuel chamber 112 for preparation of a subsequent one of fuel injection cycles.

However, in such conventional type of common rail fuel injection system, since expensive three-way electromagnetic valves the number of which is two are used, there are problems of increasing the cost and of making it difficult to reduce in size the fuel injection system itself.

In view of these problems, the present invention was made. Consequently, it is an object of the present invention to provide a fuel injection system which is capable of minimizing the cost and also capable of being reduced in its size.

SUMMARY OF THE INVENTION

Consequently, the fuel injection system of the present invention, comprising: a first accumulator for storing high-pressure fuel therein; a second accumulator for storing low-pressure fuel sufficiently lower in pressure than the fuel stored in the first accumulator; a first two-way electromagnetic valve disposed in a fuel passage connecting the first accumulator with a fuel injection nozzle; a flow control means for controlling a flow rate of fuel passing through a fuel passage connecting a downstream side of the first two-way electromagnetic valve in the fuel passage with the second accumulator, the flow control means being disposed in the fuel passage; a second two-way electromagnetic valve disposed in a fuel return passage connecting the fuel injection nozzle with a fuel tank, the second two-way electromagnetic valve switching the fuel injection modes of the fuel from its injection mode to its un-injection mode or vice versa; and, a control means for controlling both the first two-way electromagnetic valve and the second two-way electromagnetic valve so as to open and close them in response to engine's operating conditions.

Consequently, the advantage of the present invention over the related art is that: in the present invention, it is possible to perform both a low-pressure and a high-pressure injection using the low-cost two-way electromagnetic valves without using the conventional expensive three-way electromagnetic valves. Namely, since such expensive three-way electromagnetic valves used in the related art are not required in the present invention, the present invention is advantageous in that it may realize a considerable cost reduction in production of the fuel injection system, and also may reduce in size the fuel injection system. Further, by the use of the two-way electromagnetic valves, the present invention has an advantage in that it may simplify in construction the system itself and further may improve the fuel injection system in reliability.

Preferably: provided in the fuel injection nozzle is a control chamber connected with each of the fuel passage and the fuel return passage; a first throttle means for throttling an amount of fuel entering the control chamber through the first accumulator or through the second accumulator is disposed in the fuel passage; a second throttle means for throttling an amount of fuel discharged from the control chamber to the fuel tank is disposed in the fuel return passage; and, the degree of throttling in the first throttle means is so set as to be larger than in the second throttle means. In this case, for example, the first throttle means has its flow passage so set as to be smaller in cross section than the second throttle means.

Due to such construction, the present invention has an advantage in that it is possible to gradually increase an amount of fuel at the beginning of the fuel injection, which makes it possible to keep slow a burning rate of fuel at the beginning of the fuel injection, thereby helping to reduce an amount of NOx contained in the exhaust gas. Further, the present invention has an advantage in that: at the finish of the fuel injection, it is possible to rapidly reduce an amount of fuel being injected, thereby helping to reduce smoke and particulates (i.e., PM) discharged from the engine.

Further, the present invention may be constructed in a manner such that the control means controls both the first and the second two-way electromagnetic valves to open and close them in a manner such that: after the second two-way electromagnetic valve is opened in a condition in which the first two-way electromagnetic valve is held closed, the first two-way electromagnetic valve is then opened in a condition in which the second two-way electromagnetic valve is held open. In this case, the present invention has an advantage in that it is possible to easily realize a fuel injection pattern comprising: a pilot injection performed by a low-pressure fuel injection; and, a main injection performed by a high-pressure fuel injection, thereby helping to considerably reducing in amount each of NOx, smoke and particulates thus discharged.

Further, the present invention may be constructed in a manner such that the control means controls both the first and the second two-way electromagnetic valves to open and close them in a manner such that: after the second two-way electromagnetic valve is opened in a condition in which the first two-way electromagnetic valve is held closed, the second two-way electromagnetic valve is temporarily closed, and then the first and the second two-way electromagnetic valves are simultaneously opened or sequentially opened at a predetermined time interval. Also in this case, the present invention has an advantage in that it is possible to easily realize a fuel injection pattern comprising: a pilot injection performed by a low-pressure fuel injection; and, a main injection performed by a high-pressure fuel injection, thereby helping to considerably reducing in amount each of NOx, smoke and particulates thus discharged.

Further, the present invention may be constructed in a manner such that, in the present invention: further provided is a first by-pass passage connecting an upstream side of the first two-way electromagnetic valve with a downstream side of the same valve; further provided is a second by-pass passage connecting an upstream side of the second two-way electromagnetic valve with a downstream side of the same valve; a third and a fourth throttle means are disposed in the first and the second by-pass passages, respectively; and, the degree of throttling in the third throttle means is so set as to be larger than in the fourth throttle means. In this case, for example, the third throttle means has its flow passage so set as to be smaller in cross section than the fourth throttle means.

Due to such construction, it is possible for the present invention to easily discharge, without fail, the high-pressure fuel remaining in the fuel injection nozzle therefrom.

Further, in the present invention, the flow control means may be constructed of: a check valve for only permitting the fuel to flow from the second accumulator to the fuel injection nozzle; or, an orifice for throttling an amount of fuel passing through the fuel passage. The present invention thus constructed has an advantage in that it is possible to prevent, without fail, the high-pressure fuel from entering the low-pressure accumulator when the high-pressure fuel is injected.

Further, the flow control means may be constructed of: a check valve for only permitting the fuel to flow from the second accumulator to the fuel injection nozzle; and, the orifice for throttling an amount of fuel passing through the fuel passage; and, the check valve and the orifice may be connected in parallel with each other. The present invention thus constructed has an advantage in that it is possible to prevent, without fail, the high-pressure fuel from entering the low-pressure accumulator when the high-pressure fuel is injected, and also has an advantage in that it is possible to supply the low-pressure fuel without fail when the low-pressure fuel is injected.

Still further, the present invention may be constructed in a manner such that: a check valve is disposed in a downstream side of the first two-way electromagnetic valve and in an upstream side of a junction of the above two fuel passages, and only permits the fuel to flow from the first accumulator to the fuel injection nozzle; or, an orifice is disposed in a downstream side of the first two-way electromagnetic valve and in an upstream side of the junction of the above two fuel passages, and throttles an amount of fuel passing through the fuel passage. The present invention, when thus constructed, has an advantage in that it is possible to prevent the fuel from varying when the high-pressure fuel is injected, thereby realizing a stable condition of the fuel injection.

Further, the present invention may be constructed in a manner such that: a high-pressure pump is provided in an upstream side of the first accumulator to pressurize the fuel in the fuel tank to a high pressure; and, a low-pressure pump is provided in an upstream side of the second accumulator to pressurize the fuel in the fuel tank to a predetermined low pressure smaller than a pressure inside the first accumulator. In this case, it is possible to supply fuel under a desired pressure to the first and the second accumulator, without fail.

Further, the present invention may be constructed in a manner such that: a high-pressure pump is provided in an upstream side of the first accumulator to pressurize the fuel in the fuel tank to a high pressure; and, a relief valve is provided between the second accumulator and the fuel tank to keep the fuel of the second accumulator at a predetermined pressure. In the present invention thus constructed, it is possible to keep constant the fuel pressure inside the low-pressure accumulator, thereby performing the low-pressure fuel injection in a stable manner.

BRIEF DESCRIPTION OF THE DRAWINGS

FIG. 2($a$) is a diagram for illustrating in operation the fuel injection system of the first embodiment of the present invention, illustrating a fuel injection rate thereof;

FIG. 2($b$) is a diagram showing in operation the fuel injection system of the first embodiment of the present invention, illustrating an opening/closing timing of each of the electromagnetic valves;

FIG. 3 is a diagram for illustrating the fuel pressure between the electromagnetic valves in the fuel injection system of the first embodiment of the present invention;

FIG. 4($b$) is a time chart of the first modification of the fuel injection system of the first embodiment of the present invention, illustrating an opening/closing timing of each of the electromagnetic valves;

FIG. 4($c$) is a time chart of a second modification of the fuel injection system of the first embodiment of the present invention, illustrating a fuel injection rate thereof;

FIG. 4($d$) is a time chart of the second modification of the fuel injection system of the first embodiment of the present invention, illustrating an opening/closing timing of each of the electromagnetic valves;

FIG. 7 is a diagram showing in operation the third embodiment of the present invention, illustrating both the injection rate in the system and characteristics in pressure of the fuel chamber of the injector;

FIG. 11($b$) is a diagram showing in operation the sixth embodiment of the present invention, illustrating both the injection rate in the system and characteristics in pressure of the fuel chamber of the injector; and, FIG. 12 is a schematic circuit diagram of the conventional fuel injection system, illustrating essential parts of the system in construction.

PREFERRED EMBODIMENTS FOR CARRYING OUT THE INVENTION

Hereinbelow, with reference to the drawings, fuel injection systems of embodiments of the present invention will be described.

(1) Description of a First Embodiment

Figure 1:
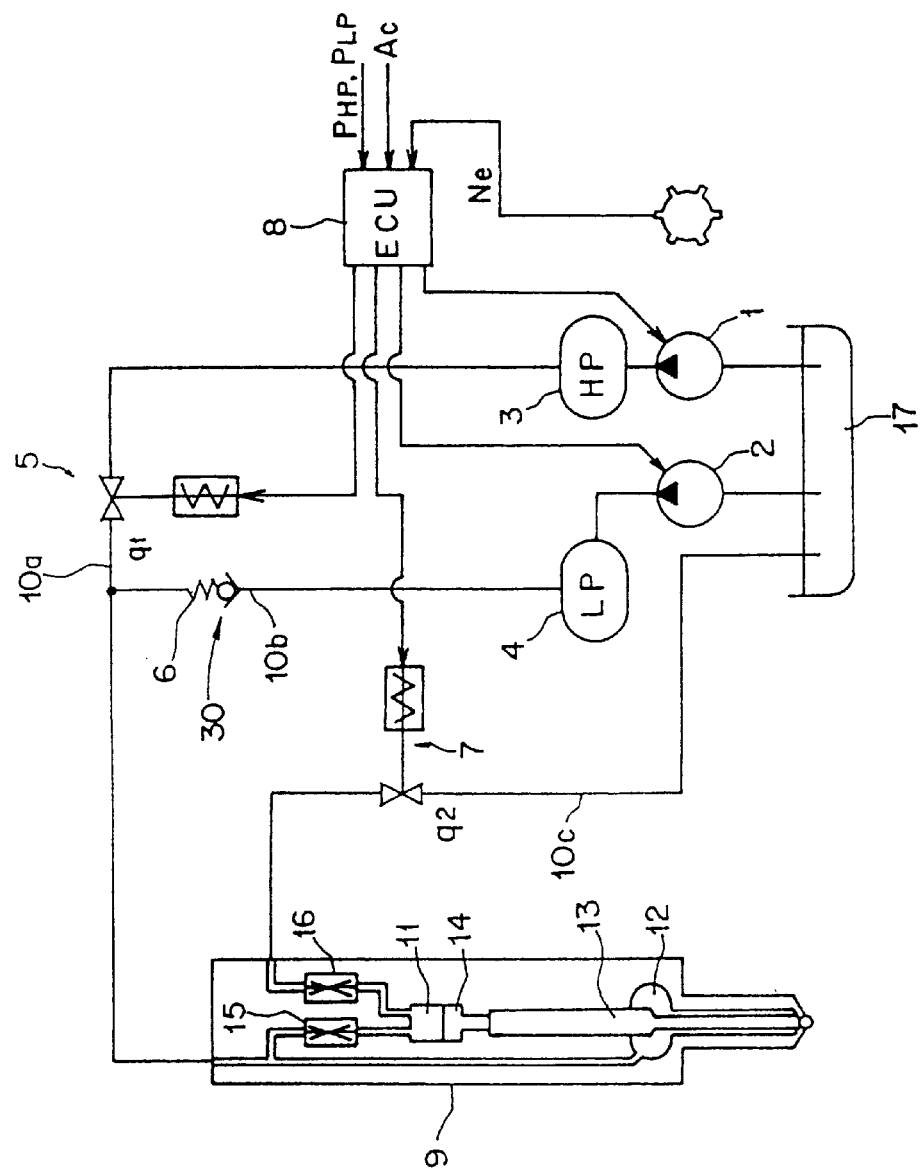
FIG. 1 is a schematic circuit diagram of the fuel injection system of a first embodiment of the present invention, illustrating essential parts of the system in construction.

Now, referring to the first embodiment, FIG. 1 is a schematic diagram for illustrating essential parts thereof in construction, wherein: I is a high-pressure pump; 2 is a low-pressure pump; 3 is a high-pressure common rail or high-pressure accumulator (a first accumulator); 4 is a low-pressure common rail or low-pressure accumulator (a second accumulator); 5 is an electromagnetic valve (a first two-way electromagnetic valve); 6 is a check valve; 7 is an electromagnetic valve (a second two-way electromagnetic valve); 8 is a controller (a control means); 9 an injector (a fuel injection nozzle); and, 30 is a flow control means.

The systems are adapted for use with a diesel engine not shown (hereinafter simply referred to as the engine), wherein the injector 9 is provided in each of cylinders of the engine.

Well, as shown in FIG. 1, the high-pressure accumulator 3 is provided in a downstream side of the high-pressure pump 1, so that fuel, which is pressurized by the high-pressure pump 1 to a predetermined high pressure, is adapted to be stored in the high-pressure accumulator 3. In addition, the high-pressure accumulator 3 is connected with the injector 9 through a fuel passage 10a.

On the other hand, disposed in this fuel passage 10a is the first two-way electromagnetic valve 5. Depending on the opening and closing state of this first two-way electromagnetic valve 5, a fuel supply from the high-pressure accumulator 3 to the injector 9 is adapted to be switched in its condition.

Here, the first two-way electromagnetic valve 5 is a normally-closed electromagnetic valve for keeping the fuel passage 10a closed in its ordinary (i.e., OFF) condition, and is so constructed as to be opened when a control signal from the controller 8 described later is ON.

On the other hand, provided in a downstream side of the low-pressure pump 2 is the low-pressure accumulator 4, so that fuel, which is pressurized by the low-pressure pump 2, is adapted to be stored in the low-pressure accumulator 4. Incidentally, the fuel inside this low-pressure accumulator 4 is adapted to be stored under pressure sufficiently lower than the pressure of fuel inside the high-pressure accumulator 3.

Further, this low-pressure accumulator 4 is connected with a downstream side of the first two-way electromagnetic valve 5 through the fuel passage 10b. Further, provided in the fuel passage 10b is the check valve 6 which forms the flow control means 30. By the use of this check valve 6, only the fuel flow from the low-pressure accumulator 4 to its downstream side is allowed, and the fuel is adapted to be prevented from reverse flowing from the fuel passage 10a to the low-pressure accumulator 4.

Consequently, when the first two-way electromagnetic valve 5 is held closed (i.e., held OFF), the low-pressure fuel accumulated in the low-pressure accumulator 4 is supplied to the injector 9. When the control signal to the first two-way electromagnetic valve 5 is switched into ON, the high-pressure fuel accumulated in the high-pressure accumulator 3 is supplied to the injector 9.

Further, formed inside the injector 9 are a control chamber 11 and a fuel chamber 12. The above-mentioned fuel passage 10a is bifurcated inside the injector 9 and connected with both the control chamber 11 and the fuel chamber 12.

Also connected with this control chamber 11 is a fuel return passage 10c. As shown in FIG. 1, provided in this fuel return passage 10c is the second two-way electromagnetic valve 7. As is in the first two-way electromagnetic valve 5, the second two-way electromagnetic valve 7 is a normally-closed electromagnetic valve for keeping the fuel return passage 10c closed in its ordinary (i.e., OFF) condition, and is so constructed as to open the fuel return passage 10c in its ON condition, thereby permitting the fuel inside the control chamber 11 to return to a fuel tank 17.

On the other hand, provided inside the injector 9 is a needle valve 13 which is so constructed as to control the opening/closing conditon of an injection hole (not shown) of the nozzle's front end when moved back and forth. More particularly, when this needle valve 13 is lifted, the injection hole of the nozzle's front end is opened so that the fuel under pressure having been supplied to the fuel chamber 12 is injected through the injection hole. When the needle valve 13 is moved down, the injection hole is closed with a front end of the needle valve 13 to stop the fuel injection.

Further, provided inside the control chamber 11 is a hydraulic piston 14 abutting against the needle valve 13. The hydraulic piston 14 is adapted to be controlled in operation by the pressure of fuel supplied to the control chamber 11. When the fuel is supplied to the control chamber 11, the hydraulic piston 14 is adapted to move the needle valve 13 downward.

Here, the needle valve 13 and the hydraulic piston 14 will be described briefly in their actuation principles. The needle valve 13 and the hydraulic piston 14 are formed in a manner such that a pressure receiving area with vertical orientation acting on the hydraulic piston 14 in the control chamber 11 is larger in area size than a pressure receiving area with vertical orientation acting on the needle valve 13 in the fuel chamber 12.

Consequently, due to a difference between such pressure receiving areas, a force moving down the hydraulic piston 14 is larger than a force moving up the needle valve 13 when fuel having the same pressure is supplied to both the control chamber 11 and the fuel chamber 12. As a result, the needle valve 13 is moved down.

Further, when the pressure inside the control chamber 11 decreases, the force moving up the needle valve 13 in the fuel chamber 12 becomes larger than the force moving down the hydraulic piston 14. As a result, the needle valve 13 is moved up.

On the other hand, a first orifice 15 and a second orifice 16 are provided in the fuel passage 10a and the fuel return passage 10c, respectively, wherein the passages 10a, 10c are connected with the control chamber 11. Of these orifices, the orifice 15 of the fuel passage 10a has its flow passage set smaller in cross section than that of the orifice 16 of the fuel return passage 10c.

And, due to this, immediately after the second two-way electromagnetic valve 7 is put into its ON condition, the needle valve 13 is moved up at a relatively slow speed to start the fuel injection. Then, when the second two-way electromagnetic valve 7 is put into its OFF condition, the needle valve 13 is moved down at a relatively high speed to stop the fuel injection. Incidentally, in brief, the reason why such control in actuation speed of the needle valve 13 is performed is that: at the beginning of the fuel injection, in order to reduce an amount of NOx contained in the exhaust gas, an amount of fuel being injected is gradually increased to keep slow the burning speed of fuel at the beginning of the combustion cycle; and, at the finish of the fuel injection, in order to reduce smoke and particulates (PM) discharged from the engine, an amount of fuel being injected is rapidly decreased.

However, the two-way electromagnetic valves 5, 7 just described in the above are not capable of achieving perfect fuel sealing for preventing the fuel from leaking therefrom, and, therefore considered to permit some fuel leakage therefrom. Although it is common to design these electromagnetic valves 5, 7 in a manner such that they do not permit any fuel leakage in their closed conditions, the system of the present invention positively controls an amount of fuel leaking from the electromagnetic valves 5, 7 in a manner such that an amount $q_1$ of fuel leaking from the first two-way electromagnetic valve 5 is so set as to be smaller than an amount $q_2$ of fuel leaking from the second two-way electromagnetic valve 7.

This is because it is necessary to discharge the high-pressure fuel, which remains in the injector 9, therefrom immediately after completion of the fuel injection. This will be described later in detail.

Further, connected with each of the electromagnetic valves 5, 7 is the controller (ECU) 8. Based on a control signal from this controller 8, each of the electromagnetic valves 5, 7 and the pumps 1, 2 is adapted to be controlled in operation.

This controller 8 is adapted to receive engine's rotation speed information Ne, fuel pressure information $P_{HP}$ in the high-pressure accumulator 3, fuel pressure information $P_{LP}$ in the low-pressure accumulator 4, accelerator's opening angle information Acc and like information. Based on these pieces of information Ne, $P_{HP}$, $P_{LP}$, Acc, the controller 8 is adapted to control each of the electromagnetic valves 5, 7 and the pumps 1, 2 in operation.

Since the fuel injection system as the first embodiment of the present invention is constructed as described above, control of the fuel injection thereof is performed, for example, as follows.

First, during a period of time in which the fuel injection is not performed, each of the electromagnetic valves 5, 7 is controlled by the controller 8 so as to be put into its OFF condition. As a result, the low-pressure fuel accumulated in the low-pressure accumulator 4 is supplied to the downstream side of the first two-way electromagnetic valve 5, so that the low-pressure fuel is supplied to both the control chamber 11 and the fuel chamber 12.

Further, since the second two-way electromagnetic valve 7 is in its OFF condition, the fuel supplied into the control chamber 11 does not drain off. Consequently, under the influence of pressure of the low-pressure fuel supplied into the control chamber 11, the hydraulic piston 14 and the needle valve 13 are moved down to close the injection hole of the injector 9, thereby preventing the fuel from being injected.

Then, at the beginning of the fuel injection, as shown in FIG. 2(b), only the second two-way electromagnetic valve 7 is switched into its ON condition by the controller 8, so that the low-pressure fuel is injected. More particularly, when the second two-way electromagnetic valve 7 is switched into its ON condition, the low-pressure fuel in the control chamber 11 drains off through the orifice 16 and the fuel return passage 10c, so that the needle valve 13 is moved up when a force for moving up the needle valve 13 in the fuel chamber 12 reaches a value larger than that of a force for moving down the hydraulic piston 14, whereby the low-pressure fuel is injected from the injector 9. In this case, as shown in FIG. 2(a), it is possible to increase the fuel injection rate at a relatively small inclination at the beginning of the fuel injection. Incidentally, a vertical axis in FIG. 2(a) shows the fuel injection rate (i.e., an amount of fuel being injected per unit time).

And, at the beginning of the fuel injection, by injecting the low-pressure fuel in a manner such that the fuel injection rate increases slowly, it is possible to have the burning speed be slow at the beginning of the combustion cycle, thereby reducing an amount of NOx contained in the exhaust gas.

Further, after the elapse of a predetermined period of time after the fuel injection starts, the first two-way electromagnetic valve 5 is switched into its ON condition by the controller 8 in a condition in which the second two-way electromagnetic valve 7 is held in its ON condition by the controller 8. As a result, the high-pressure fuel is supplied to the fuel chamber 12 and ejected from the injector 9 (high-pressure fuel injection).

In this case, though the high-pressure fuel is supplied also into the control chamber 11, the high-pressure fuel thus supplied to the control chamber 11 is drained through the fuel return passage 10c since the second two-way electromagnetic valve 7 is in its ON condition. Further, since the orifice 15 is so set as to be smaller in flow passage s cross section than the orifice 16, there is no increase in fuel pressure in the control chamber 11, and, therefore no downward-motion in both the hydraulic piston 14 and the needle valve 13, whereby the fuel injection keeps on.

After the fuel injection is performed for a predetermined time duration, both the first two-way electromagnetic valve 5 and the second two-way electromagnetic valve 7 are switched into their ON conditions by the controller 8 at the end of the fuel injection. Due to this, the high-pressure fuel supplied to the control chamber 11 acts on the hydraulic piston 14 to move it down. Then, the hydraulic piston 14 moves the needle valve 13 downward to close the injection hole of the injector 9, so that the fuel injection comes to the finish.

In this case, when the second two-way electromagnetic valve 7 is switched into its OFF condition, since the high-pressure fuel in the control chamber 11 immediately acts on the hydraulic piston 14, the needle valve 13 operates more quickly at this time than it does at the beginning of the fuel injection. Due to this, as shown in FIG. 2(a), at the end of the fuel injection, it is possible for the fuel injection to come to its finish at an inclination steeper than that of the beginning of the fuel injection.

In addition, at the end of the fuel injection, as described above, it is possible to sharply reduce the amount of fuel being injected, and, therefore possible to reduce the smoke and particulates (PM) discharged from the engine.

On the other hand, at the end of the fuel injection as described above, since the second two-way electromagnetic valve 7 is switched into its OFF condition to close the fuel return passage 10c, the fuel under pressure is considered to remain in the injector 9 and also in each of the fuel passages 10a, 10c between the electromagnetic valves 5, 7. Particularly, in the latter half of the fuel injection cycle, since the high-pressure fuel is injected, the high-pressure fuel in a downstream side of the first two-way electromagnetic valve 5 is not drained, but remains therein.

When the high-pressure fuel remains in the injector 9 as described above, at the beginning of a subsequent cycle of the fuel injection, such remaining high-pressure fuel is injected. Due to this, there is a fear that NOx is not sufficiently reduced.

In contrast with this, in the fuel injection system of the present invention, since a fuel leakage rate $q_1$ in the first two-way electromagnetic valve 5 is so set as to be smaller than that $q_2$ in the second two-way electromagnetic valve 7, when the fuel injection comes to the finish and the first two-way electromagnetic valve 5 and the second two-way electromagnetic valve 7 are switched into their OFF conditions, the high-pressure fuel remaining in the injector 9 is drained into the fuel tank 17. At the same time, supplied to both the control chamber 11 and the fuel chamber 12 is the low-pressure fuel from the low-pressure accumulator 4, which makes it possible to prepare for a subsequent cycle of the fuel injection.

Due to this, as shown in FIG. 3, after completion of the fuel injection, the pressure between the first two-way electromagnetic valve 5 and the second two-way electromagnetic valve 7 gradually reduces. Consequently, at the beginning of the subsequent cycle of the fuel injection, with the use of the low-pressure fuel, the fuel injection is conducted.

Incidentally, such fuel leakage rates $q_1$ and $q_2$ are so set as to: be sufficiently smaller than a fuel discharge rate of the pump 1 and that of the pump 2, respectively; and, prevent the pressure of fuel from excessively decreasing at the beginning of the subsequent cycle of the fuel injection.

As described above, by means of this system, without using the expensive three-way electromagnetic valves such as ones described above in connection with the related art, but with the use of the low-cost two-way electromagnetic valves 5, 7, it is possible to realize both a low-pressure and a high-pressure fuel injection, and, therefore possible to provide a fuel injection system smaller in size and lower in cost. In other words, since such expensive three-way electromagnetic valves used in the related art are not required, the present invention has an advantage in that it is possible to realize a considerable reduction in manufacturing cost and a reduction in size of the fuel injection system. Further, with the use of the two-way electromagnetic valves 5, 7, the present invention has an advantage in that it is possible to simplify the system itself in construction, and also possible to improve the fuel injection system in reliability.

Further, as shown in FIG. 2(a), since it is possible to easily produce a fuel injection wave form comprising a low-pressure and a high-pressure injection wave form, the present invention has an advantage in that it is possible to considerably reduce NOx, smoke and particulates in their emission rates.

Further, by setting the fuel leakage rate $q_1$ in the first two-way electromagnetic valve 5 so as to be smaller than that $q_2$ in the second two-way electromagnetic valve 7, it is possible to drain the high-pressure fuel remaining in the injector 9 at the end of the fuel injection, which enables the low-pressure fuel to be injected at the beginning of a subsequent cycle of the fuel injection without fail. Further, the present invention has another advantage in that it is possible to improve the engine in fuel consumption and power output.

Figure 4A:
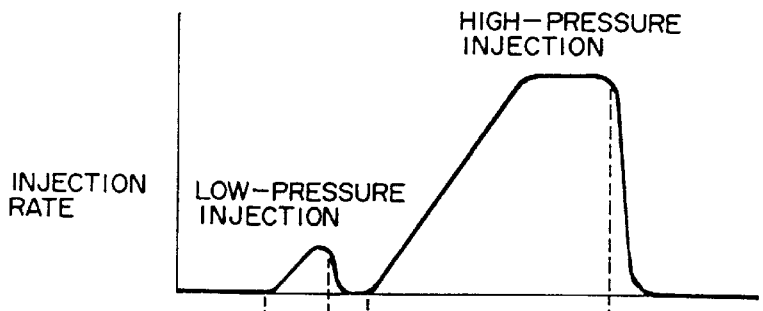
FIG. 4($a$) is a time chart of a first modification of the fuel injection system of the first embodiment of the present invention, illustrating a fuel injection rate thereof.
Figure 4B:
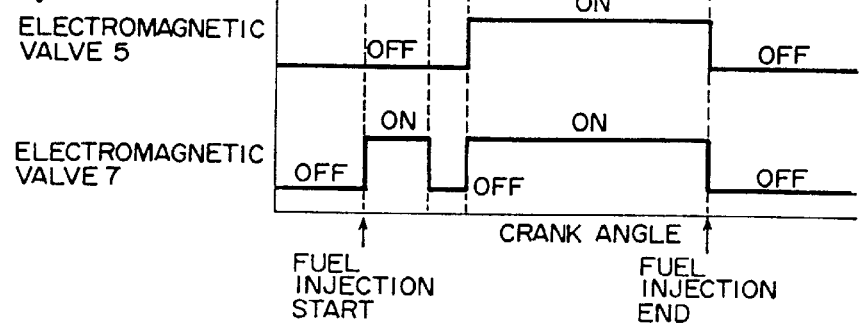
Figure 4C:
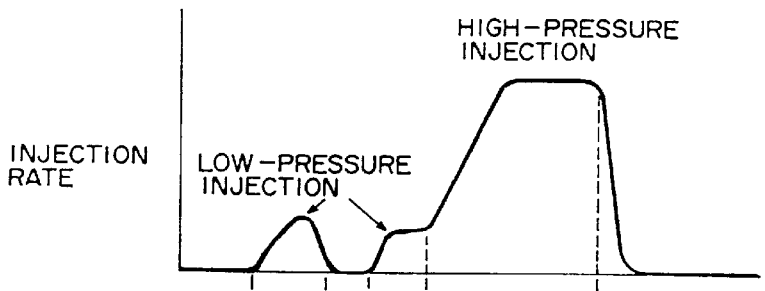
Figure 4D:
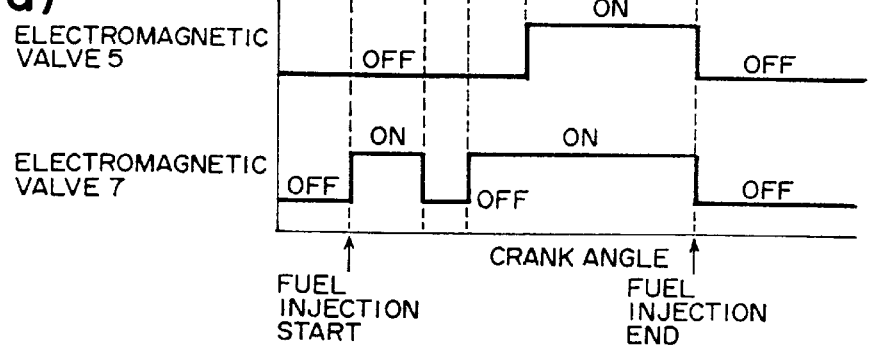

Then, modifications of the first embodiment will be described. Each of the modifications is constructed in the same manner as that of the above embodiment, only except that the first two-way electromagnetic valve 5 and the second two-way electromagnetic valve 7 operate in different manners, as shown in FIGS. 4(a), 4(b), 4(c) and 4(d). Incidentally, FIGS. 4(a) and 4(b) are time charts for describing a first one of the modifications. FIGS. 4(c) and 4(d) are time charts for describing a second one of the modifications.

Now, the first modification will be described. As shown in FIG. 4(b), in this first modification, at the beginning of the fuel injection, first of all, only the second two-way electromagnetic valve 7 is switched into its ON condition for a predetermined period of time by the controller 8. Further, for such period of time, the first two-way electromagnetic valve 5 is held in its OFF condition. Due to this, at the beginning of the fuel injection, as shown in FIG. 4(c), the low-pressure fuel is independently injected as a pilot injection through the injector 9.

Then, after the second two-way electromagnetic valve 7 is temporarily switched into its OFF condition, both the first two-way electromagnetic valve 5 and the second two-way electromagnetic valve 7 are switched into their ON conditions at the same time, so that the high-pressure fuel is injected. After that, as shown in FIG. 4(b), both the first two-way electromagnetic valve 5 and the second two-way electromagnetic valve 7 are switched into their OFF conditions at the same time.

Due to this, it is possible to obtain substantially the same actions and effects.

Next, the second modification will be described. As shown in FIGS. 4(c) and 4(d), this second modification differs from the first modification in that it has the two-way electromagnetic valves 5, 7 operate in different manners in a main injection following the low-pressure fuel injection.

In other words, as shown in FIG. 4(c), at the beginning of the fuel injection, first of all, only the second two-way electromagnetic valve 7 is switched into its ON condition for a predetermiend period of time under the control of the controller 8. Further, for such period of time, the first two-way electromagnetic valve 5 is held in its OFF condition. Due to this, at the beginning of the fuel injection, as shown in FIG. 4(c), the low-pressure fuel is independently injected as a pilot injection through the injector 9.

Then, after the second two-way electromagnetic valve 7 is temporarily switched into its OFF condition, as shown in FIG. 4(b), the first two-way electromagnetic valve 5 and the second two-way electromagnetic valve 7 are controlled to be switched into their ON conditions in sequence with a time lag therebetween, so that the high-pressure fuel is injected. In this case, the second two-way electromagnetic valve 7 is opened earlier than the first two-way electromagnetic valve 5, so that the low-pressure fuel injection is partially conducted at the beginning of the main injection.

And, also in such fuel injection, substantially the same actions and effects as those described in the above are obtained.

Incidentally, in the first embodiment described above, though there are provided the high-pressure pump 1 and the low-pressure pump 2, the present system is not limited to the above construction. For example, it is also possible to employ a construction in which: only the high-pressure pump 1 is provided; and, a regulator, which reduces in pressure the fuel discharged from the high-pressure pump 1 to a predetermined value, is provided in an upstream side of the low-pressure accumulator 4.

(2) Description of a Second Embodiment

Next, the second embodiment of the present invention will be described.

Figure 5:
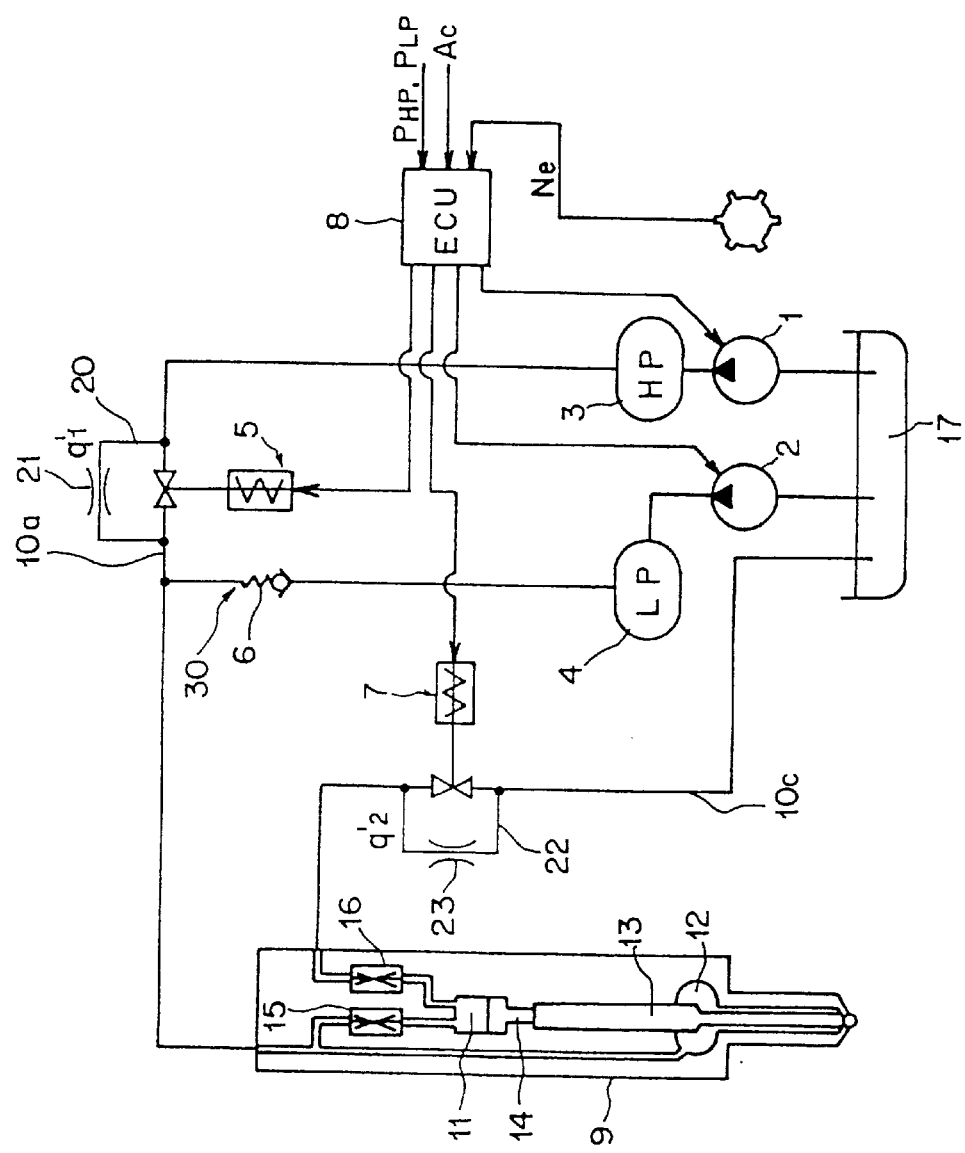
FIG. 5 is a schematic circuit diagram of the fuel injection system of a second embodiment of the present invention, illustrating essential parts of the system in construction.

As shown in FIG. 5, this embodiment has substantially the same construction as that of the first embodiment. Consequently, like reference characters and/or numerals apply to similar parts, and are not further explained here.

As shown in FIG. 5, in this embodiment, in the vicinity of the first two-way electromagnetic valve 5, there is provided a by-pass passage (first bypass passage) 20 for connecting an upstream side of this first two-way electromagnetic valve 5 with its downstream side. Provided in this by-pass passage 20 is an orifice (third throttle means) 21.

Further, in the same way, in the vicinity of the second two-way electromagnetic valve 7, there is provided a by-pass passage (second bypass passage) 22 for connecting an upstream side of this second two-way electromagnetic valve 7 with its downstream side. Provided in this by-pass passage 22 is an orifice (fourth throttle means) 23.

And, in this embodiment, the orifice 21 has its flow passage so set as to be smaller in cross section than the orifice 23. Due to this, a flow rate (by-pass flow rate) $q_1'$ of fuel passing through the orifice 21 is smaller than a flow rate (by-pass flow rate) $q_2'$ of fuel passing through the orifice 23, which precludes the necessity for setting the leakage rate in each of the electromagnetic valves 5, 7 such as ones described in the first embodiment.

In other words, though a slight fuel leakage occurs in a sealing portion and the like of each of the electromagnetic valves 5, 7, the provision of the orifices 21, 23 in the by-pass passages 20, 22, in which the by-pass flow rates $q_1'$, $q_2'$ of fuel passing through the orifices 21, 23 are so set as to satisfy a predetermined relationship ($q_1'<q_2'$) as described above, can drain off the high-pressure fuel remaining in the injector 9 much more easily and accurately than is possible by so setting the sealing portion and the like as to have the fuel leakage rates $q_1$, $q_2$ therein satisfy a predetermined relationship ($q_1<q_2$).

Since the fuel injection sytem as the second embodiment of the present invention is constructed as described above, during a period of time from the beginning of the fuel injection to the end thereof, control of each of the electromagnetic valves 5, 7 is carried out as is in the first embodiment.

And, after completion of the fuel injection, the high-pressure fuel remaining between the first two-way electromagnetic valve 5 and the second two-way electromagnetic valve 7 is drained off through the orifice 23 without fail before a subsequent cycle of the fuel injection starts.

Due to this, in addition to the same actions and effects of the first embodiment, the second embodiment has an advantage in that it is possible to easily and accurately drain off the high-pressure fuel remaining in the injector 9, and also possible to further reduce the number of manufacturing steps and the manufacturing costs.

Incidentally, in this embodiment, the fuel by-pass rates $q_1'$, $q_2'$ are so set as to be sufficiently smaller than the discharge rates of fuel from the pumps 1, 2, to the extent that the pressure of fuel is prevented from excessively reducing at the beginning of a subsequent cycle of the fuel injection. Further, depending upon setting of the by-pass rate $q_2'$, it is possible to eliminate the provision of the by-pass passage 20 and the throttle 22 for by-passing the first two-way electromagnetic valve 5.

Further, in the second embodiment described above, through the high-pressure pump 1 and the low-pressure pump 2 are provided, this system is not limited to such things. For example, this system may have a construction in which: only the high-pressure pump 1 is provided; and, a regulator for reducing in pressure the fuel discharged from the high-pressure pump 1 is provided in an upstream side of the low-pressure accumulator 4 to permit the low-pressure fuel to be supplied to the low-pressure accumulator 4.

(3) Description of a Third Embodiment

Next, the third embodiment of the present invention will be described.

Figure 6:
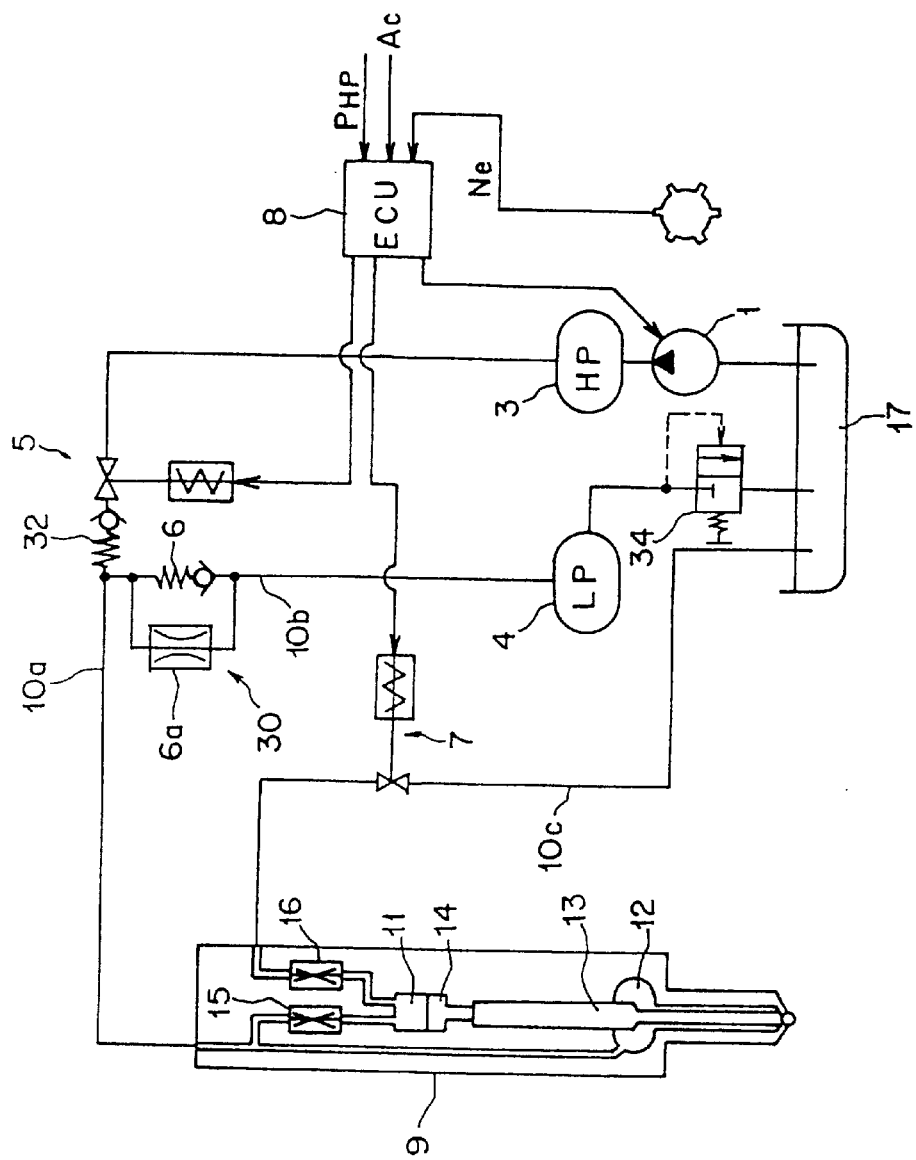
FIG. 6 is a schematic circuit diagram of the fuel injection system of a third embodiment of the present invention, illustrating essential parts of the system in construction.

As shown in FIG. 6, this third embodiment has substantially the same construction as that of the first embodiment. Consequently, like reference characters and/or numerals apply to similar parts, and are not further explained here.

Well, this third embodiment differs in construction from the first embodiment essentially in the following three point:

①The flow control means 30 is constructed of the check valve 6 and an orifice 6a;

②In place of the low-pressure pump 2, a relief valve 34 is provided; and

③A check valve 32 is disposed in a position which is in a downstream side of the first two-way electromagnetic valve 5 and in an upstream side of the confluence of the fuel passages 10a and 10b.

First, as for ①, as shown in FIG. 6, the flow control means 30 is constructed of: the check valve 6 provided in a downstream side of the low-pressure accumulator 4; and, the orifice 6a connected in parallel with this check valve 6.

On the other hand, the first and the second embodiment are constructed in a manner such that the high-pressure fuel remaining in the injector 9 and the like after completion of the fuel injection is discharged through the fuel return passage 10c into the fuel tank 17, and, therefore permit such high-pressure fuel to return to a condition under the atmospheric pressure. More particularly, energy required for pressurizing the fuel is thrown away by an amount of energy stored in the fuel thus drained, which makes it impossible to sufficiently and effectively use the energy.

So, in this embodiment, there is provided the orifice 6a to permit the high-pressure fuel remaining in the injector 9 to pass through the orifice 6a, and, therefore to be accumulated in the low-pressure accumulator 4, so that energy is effectively used.

In here, the flow passage of the orifice 6a is so formed and set as to be sufficiently smaller in cross section than the fuel injection hole of the injector 9, whereby the high-pressure fuel is prevented from reverse flowing into the low-pressure accumulator 4 through the orifice 6a when the high-pressure fuel is injected. For example, in case that the injector 9 is provided with five fuel injection holes each of which has a diameter of 0.2φ, this orifice 6a is formed so as to have its diameter in hole be approximately 0.2φ. In other words, in this case, the cross-sectional area of the flow passage in the orifice 6a is set so as to correspond to approximately one fifth of the total cross-sectional area of the fuel injection holes of the injector 9. Incidentally, in its setting, the cross-sectional area of the flow passage of the orifice 6a depends on fuel pressures, fuel injection duration, fuel viscosities and like conditions, and, therefore is not limited to the above value. Further, it has been confirmed by simulation computation that: under such conditions described above, the orifice 6a does not affect the fuel injection wave form [see FIG. 2(a)] at all.

Consequently, when the low-pressure fuel is injected, the low-pressure fuel is supplied from the low-pressure accumulator 4 to the control chamber 11 and the fuel chamber 12 through the check valve 6 and the orifice 6a.

Further, when the high-pressure fuel is injected, the first two-way electromagnetic valve 5 is opened so that the high-pressure fuel is supplied to the control chamber 11 and the fuel chamber 12 through the fuel passage 10a. At this time, since the orifice 6a has its flow passage so set as to be sufficiently smaller in cross section than the fuel injection hole of the injector 9, the high-pressure fuel is injected through the injector 9 without reverse flowing through the fuel passage 10b.

On the other hand, after completion of the fuel injection, the high-pressure fuel remaining in the injector 9 and the fuel passages 10a, 10c is accumulated in the low-pressure accumulator 4 through the orifice 6a before a subsequent cycle of the fuel injection starts.

Namely, after completion of the fuel injection, since the fuel passage 10b is lower in pressure than the injector 9 and the fuel passages 10a, 10c, such remaining fuel gradually flows into the low-pressure accumulator 4 through the orifice 6a. Then, when the low-pressure accumulator 4 is equal in fuel pressure to the injector 9, the flow of fuel into this low-pressure accumulator 4 stops.

Incidentally, in this third embodiment, in contrast with the first embodiment: there is no need of setting the fuel leakage rates $q_1$, $q_2$ of the sealing portions and the like in the electromagnetic valves 5, 7 in a manner such that they satisfy a predetermined relationship ($q_1 < q_2$); and, the fuel leakage rates are so controlled as to be as small as possible.

Then, as for ②, as shown in FIG. 6, in this third embodiment: there is not provided the low-pressure pump 2 described in the first embodiment (see FIG. 1); and, in place of it, a relief valve 34 is provided between the low-pressure accumulator 4 and the fuel tank 17.

Hereinbelow, the reason why the low-pressure pump is not provided here will be described. This is because the high-pressure fuel remaining in the injector 9 after completion of the fuel injection may flow into the low-pressure accumulator 4 through the orifice 6a, and, therefore there is no need of pressurizing the fuel by the pump to supply the thus pressurized fuel to the low-pressure accumulator 4.

Further, since the high-pressure fuel remaining in the injector 9 flows into the low-pressure accumulator 4, there is provided the relief valve 34 for keeping the interior of the low-pressure accumulator 4 at a predetermined pressure.

Incidentally, as the relief valve 34, though there is shown in the drawings the provision of a mechanical pressure regulating valve which opens when the interior of the low-pressure accumulator 4 reaches a predetermined pressure, in addition to this, it is also possible for the relief valve 34 to be constructed by the use of an electromagnetic valve which is duty-controlled on the basis of a control signal from the controller 8.

Further, it is also possible to provide a low-pressure pump (see the reference numeral 2 shown in FIG. 1) between the low-pressure accumulator 4 and the fuel tank 17, which low-pressure pump is so constructed as to be connected with the low-pressure accumulator 4 in parallel with the relief valve 34.

Further, in addition to this, it is also possible to provide a regulator, which reduces in pressure the fuel dishcarged from the high-pressure pump 1 to a predetermined value, in an upstream side of the low-pressure accumulator 4, and to arrange this regulator and the relief valve 34 in parallel to connect them with the low-pressure accumulator 4.

Then, as for ③, as shown in FIG. 6, in a downstream side of the first two-way electromagnetic valve 5 and in an upstream side of the confluence of the fuel passages 10a, 10b, there is provided the check valve 32 in arrangement. This check valve 32 permits only passage of fuel from the side of the high-pressure accumulator 3 to the side of the injector 9, and prevents the fuel from reverse flowing from the injector 9.

Incidentally, the reason why such check valve 32 is provided is that it is necessary to suppress variation of pressure in fuel occurring at a time when the fuel injection is switched from its low-pressure fuel injection mode into its high-pressure fuel injection mode during the fuel injection cycle, thereby suppressing variation of the fuel injection wave form as much as possible.

Here, FIG. 7 is a diagram illustrating simulation computation results of both a fuel injection rate (i.e., a volume of fuel injected per unit time) and a fuel pressure inside the fuel chamber 12 in both cases: one of which is shown in solid line, wherein the check valve 32 is provided in a downstream side of the first two-way electromagnetic valve 5; and, the other of which cases is shown in dotted line, wherein this check valve 32 is not provided. Further, in such simulation computation, its results are derived from conditions in which: the fuel pressure in the high-pressure accumulator 3 is 120 MPa; the fuel pressure in the low-pressure accumulator 4 is 15 MPa; and, the fuel pressure switching time (a time when the first two-way electromagnetic valve 5 is switched into its ON condition) is at 0.5 ms after the beginning of the low-pressure fuel injection (a time when the second two-way electromagnetic valve 7 is switched into its ON condition).

Well, as shown in dotted line in FIG. 7, in case that the check valve 32 is not provided, when the low-pressure fuel injection mode is switched into the high-pressure fuel injection mode, it is recognized that the pressure of the fuel chamber 12 and the injection wave form vary largely.

This is due to variation of pressure caused by inflow of the high-pressure fuel. More specifically, when the first two-way electromagnetic valve 5 is opened to perform the high-pressure fuel injection, a pressure difference is suddenly produced inside the fuel passage 10a, and, as a result, a pressure wave is produced inside the fuel passage 10a. And, the injection wave form varies largely in proportion to the amplitude of this pressure wave.

Further, due to this pressure wave, a reflected wave is produced between the open end of the fuel injection hole of the injector 9 and the high-pressure accumulator 3. And, when this reflected wave reaches the the high-pressure accumulator 3, a pressure variation is produced also in the high-pressure accumulator 3 to create a cause of disturbance in the injection wave form too.

And, when the injection wave form varies largely as described above, there is a fear that the smoke is discharged and the fuel consumption becomes poor. In other words, when the pressue variation occurs to disturb the injection wave form in the high-pressure fuel injection, there is a possibility that the fuel injected at a time when the fuel injection pressure is in a low level (in FIG. 7, when the fuel chamber pressure drops largely) is not sufficiently atomized in the cylinder, and, therefore becomes unstable in combustion so that the smoke is produced and the fuel consumption becomes poor.

Consequently, in this embodiment, in order to suppress such pressure variation as mush as possible to minimize its influence on the injection wave form, there is provided the check valve 32. More particularly, in this embodiment, by providing the check valve 32 in the downstream side of the first two-way electromagnetic valve 5, it is possible to suppress a sudden variation of pressure in the fuel passage 10a. This is due to the check valve 32 serving as a flow passage resistance. Further, since the sudden variation of pressure is suppressed, the amplitude of a pressure wave produced at a time when the first two-way electromagnetic valve 5 is opened becomes smaller, so that a disturbance in the fuel injection wave form is suppressed as much as possible.

Further, by providing the check valve 32, it is possible to prevent the reflected wave from entering the high-pressure accumulator 3 through the open end of the fuel injection hole of the injector 9, thereby eliminating the influence of the reflected wave over the fuel injection.

Consequently, as shown in solid line in FIG. 7, it is possible to suppress the pressure variation in the fuel chamber 12 and the disturbance of the injection wave form, thereby obtaining a stable injection wave form.

Since the fuel injection system as the third embodiment of the present invention is constructed as described above, its operation will be described in brief, for example, as follows.

Incidentally, operations common with those of the first embodiment will be partially omitted in the following description.

First, when the fuel injection is not performed, both the electromagnetic valves 5, 7 are so controlled as to be switched into their OFF conditions under the control of the controller 8. Due to this, the low-pressure fuel accumulated in the low-pressure accumulator 4 is supplied to the downstream side of the first two-way electromagnetic valve 5 through the check valve 6 and the orifice 6a, and, therefore supplied to the control chamber 11 and the fuel chamber 12. Incidentally, due to the pressure of the low-pressure fuel supplied into the control chamber 11, both the hydraulic piston 14 and the needle valve 13 are urged downward to close the injection hole of the injector 9.

Then, when the fuel injection starts, by means of the controller 8, only the second two-way electromagnetic valve 7 is switched into its ON condition. Due to this, the needle valve 13 is lifted to perform the low-pressure fuel injection. Further, in the low-pressure fuel injection, the low-pressure fuel is supplied from the low-pressure accumulator 4 through the check valve 6 and the orifice 6a.

Further, after the elapse of a predetermined period of time after the low-pressure fuel injection starts, the first two-way electromagnetic valve 5 is switched into its ON condition in a condition in which the second two-way electromagnetic valve 7 is held in its ON condition by the controller 8, so that the high-pressure fuel is injected through the injector 9. Incidentally, since the orifice 6a is sufficiently smaller in cross section of flow passage than the fuel injection hole of the injector 9, there is substantially no fear that the high-pressure fuel flows into the low-pressure accumulator 4 when the high-pressure fuel is injected.

On the other hand, in such high-pressue fuel injection, since the high-pressure fuel in the high-pressure accumulator 3 is supplied to the side of the injector 9 through the check valve 32, a sudden variation of pressure in the fuel passage 10a is suppressed. In other words, by supplying the high-pressure fuel through the check valve 32, it is possible to make relatively mild the variation of pressure in the fuel passage 10a.

Consequently, the amplitude of the pressure wave reaching the fuel chamber 12 becomes smaller, so that the pressure variation in the fuel chamber 12 is suppressed. Further, since the pressure variation in the fuel chamber 12 is suppressed, the disturbance of the fuel injection wave form is also suppressed.

Further, though such presssure wave is reflected from the open end of the fuel injection hole of the injector 9 to produce the reflected wave, the propagation of such reflected wave from the open end of the fuel injection hole of the injector 9 to the high-pressure accumulator 3 is blocked-off by the check valve 32, so that the influence of such reflected wave is removed as much as possible.

Due to this, as shown in solid line in FIG. 7, the pressure variation in the fuel chamber 12 is suppressed, which enables the high-pressure fuel to be injected with a stable injection wave form.

On the other hand, when the fuel injection comes to the finish after completion of the high-pressure fuel injection performed for a predetermined period of time, both the first two-way electromagnetic valve 5 and the second two-way electromagnetic valve 7 are switched into their OFF conditions by the controller 8, so that the needle valve 13 moves down to finish the fuel injection cycle.

At this time, though the high-pressure fuel remains inside the injector 9 and the fuel passages 10a, 10c between the electromagnetic valves 5, 7, such remaining high-pressure fuel flows into the low-pressure accumulator 4 through the orifice 6a provided in the fuel passage 10b. In other words, since the pressure of fuel remaining inside the injector 9 and the like is sufficiently higher than the fuel pressure inside the low-pressure accumulator 4, such remaining high-pressure fuel flows into the low-pressure accumulator 4 through the orifice 6a.

In a manner described above, the fuel is gradually stored in the low-pressure accumulator 4. When the pressure inside the low-pressure accumulator 4 reaches a predetermined value or a value more than it, the relief valve 34 opens to return the excess amount of fuel being removed to the fuel tank 17.

And, the pressure of fuel remaining in the control chamber 11 and the fuel chamber 12 gradually reduces to the same level as that of the low-pressure accumulator 4 to prepare the low-pressure fuel injection performed in a subsequent cycle.

As described above, according to the fuel injection system as the third embodiment of the present invention, an advantage is found in that: since the fuel remaining in the interior of the injector 9 after completion of the fuel injection and the like is stored in the low-pressure accumulator 4, it is possible to improve the system in energy efficiency.

In other words, when the high-pressure fuel remaining in the interior of the injector 9 and the like is discharged into the fuel tank 17, this high-pressure fuel comes to the atmospheric pressure so that the energy required to pressurize the fuel is lost.

In contrast with this, in this system, since the high-pressure fuel remaining in the interior of the injector 9 and the like is not discharged into the fuel tank 17, but stored in the low-pressure accumulator 4, an advantage is found in that such energy described above is recovered.

Incidentally, in general, though it is considered that the high-pressure pump 1 and the low-pressure pump are constructed of mechanical pumps driven by the engine, in this case, it is possible to reduce the engine's power loss to such an extent that the low-pressure pump is removed in use, due to which an advantage is found in that the engine's fuel consumption and power output are improved.

Further, since the relief valve 34 is provided between the low-pressure accumulator 4 and the fuel tank 17 to keep the low-pressure accumulator 4 at a predetermined pressure, an advantage is found in that the low-pressure accumulator 4 is kept at the predetermined pressure to stabilize in operation the low-pressure fuel injection.

Further, in the beginning of the high-pressure fuel injection, since a sudden pressure variation is suppressed and the influence of the reflected wave is eliminated by means of the check valve 32, it is also possible to suppress the disturbance of the fuel injection wave form during the high-pressure fuel injection cycle.

Consequently, an advantage is found in that it is possible to realize a stable state of the fuel injection and to keep good the combustion state of the engine. Further, due to this, there is an advantage in that it is possible to reduce the discharge of smoke and also possible to improve the fuel consumption and the power output.

(4) Description of a Fourth Embodiment

Then, the fourth embodiment of the present invention will be described.

Figure 8:
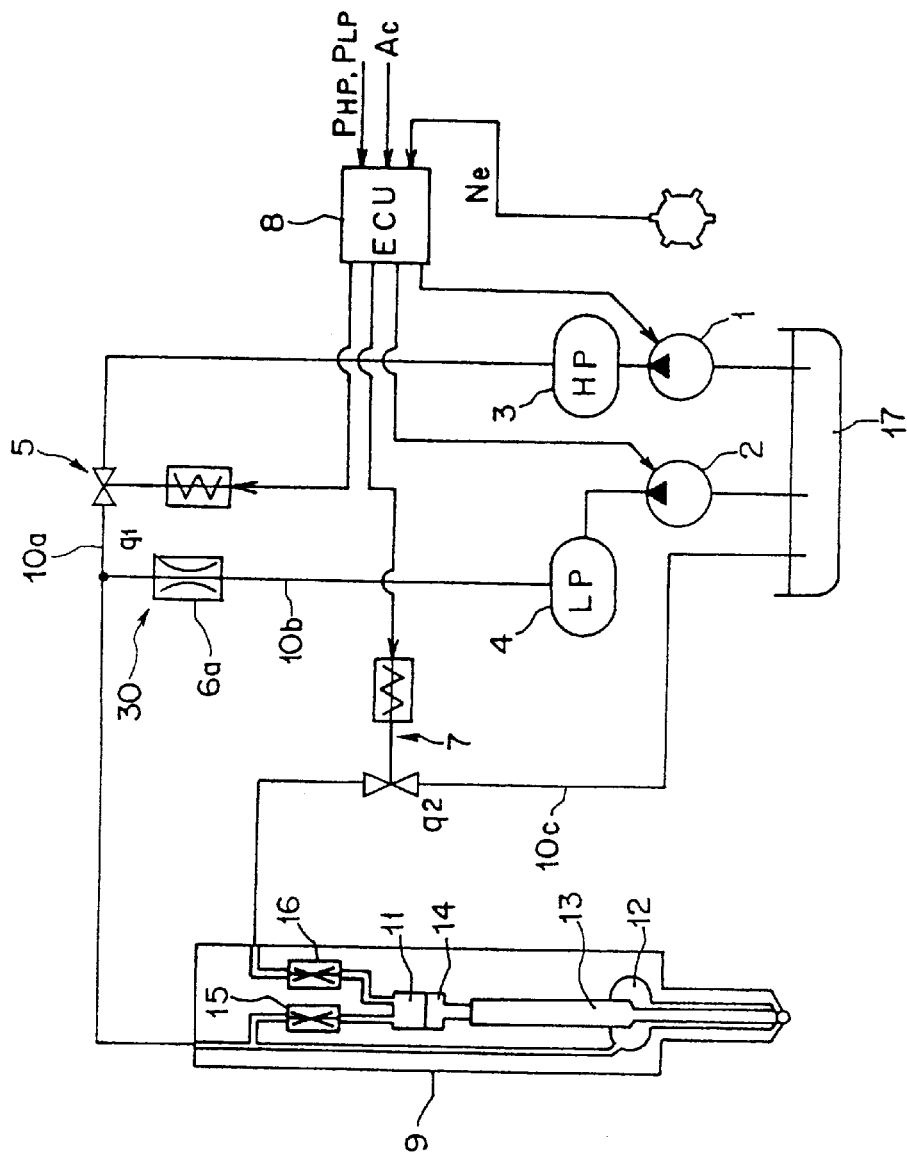
FIG. 8 is a schematic circuit diagram of the fuel injection system of a fourth embodiment of the present invention, illustrating essential parts of the system in construction.

As shown in FIG. 8, this fourth embodiment has substantially the same construction as that of the first embodiment. Consequently, like reference characters and/or numerals apply to similar parts, and are not further explained here.

First, principally, a difference between the fourth and the first embodiment will be described. The only one difference therebetween lies in the fact that: in the first embodiment described above, as the flow control means 30, the check valve 6 is used, whereas, in this fourth embodiment, the orifice 6a is used as such flow control means 30.

And, in this embodiment, by providing such orifice 6a, the high-pressure fuel remaining after completion of the fuel injection is returned to the low-pressure accumulator 4 through the orifice 6a.

In here, this orifice 6a has substantially the same construction as that described in the third embodiment described above. More specifically, the orifice 6a is so formed and set as to have its flow passage be sufficiently smaller in cross section than the fuel injection hole of the injector 9, whereby the high-pressure fuel is prevented from reverse flowing into the low-pressure accumulator 4 through the orifice 6a when the high-pressure fuel is injected.

On the other hand, when the flow passage of the orifice 6a is so formed as to be smaller in cross section than the fuel injection hole of the injector 9, the fuel injected through the injector 9 is larger in quantity than that supplied through the orifice 6a.

Consequently, when the time duration of the low-pressure fuel injection is extended, the amount of the low-pressure fuel filled in the fuel passage 10a is reduced. Consequently, this cross sectional area of the flow passage in the orifice 6a is determined with consideration for: setting of the time duration of the low-pressure fuel injection; and, setting of the fuel injection wave form in the low-pressure fuel injection, in addtion to setting of the cross sectional area of the fuel injection hole in the injector 9.

In other words, so long as the flow passage of the orifice 6a is so formed as to be sufficiently smaller in cross section than the fuel injection hole of the injector 9, it is possible that: as more and more the cross sectional area of the flow passage in the orifice 6a is reduced in setting, or, as more and more the time duration of the low-pressure fuel injection is increased in setting, or, as more and more the time interval in operation between the electromagnetic valves 5 and 7 is increased in setting, the low-pressure fuel injection wave form pattern approaches more and more to a wave form pattern of injection such as a pilot injection (see FIG. 4(a)). This is because all the fuel supplied through the orifice 6a is injected when the low-pressure fuel is injected.

Further, as more and more the flow passage of the orifice 6a is increased in cross section in setting, or, as more and more the time duration of the low-pressure fuel injection is decreased in setting, or, as more and more the time interval in opeation between the electromagnetic valves 5 and 7 is decreased in setting, an injection wave form pattern (see FIG. 2(a)) in which the low-pressure fuel injection is continuously followed by the high-pressure fuel injection is more and more realized in a favorable manner. This is because a sufficient amount of fuel is supplied to the injector 9 through the low-pressure accumulator 4 when the low-pressure fuel is injected.

Consequently, setting in cross section of the flow passage of the orifice 6a depends on setting of each of the time duration of the injection and the fuel injection wave form pattern in the low-pressure fuel injection.

And, as the flow control means 30, by using only the orifice 6a, it is possible to effectively use energy with a simple construction.

Incidentally, as is in the third embodiment described above, in place of the low-pressure pump 2, it is possible to provide a relief valve in a downstream side of the low-pressure accumulator 4 so as to form a construction in which the low-pressure accumulator 4 has its interior kept at a predetermined pressure. Further, it is also possible to form another construction in which both a relief valve and the low-pressure pump 2 are provided in parallel in the downstream side of the low-pressure accumulator 4. Further, as is in the third embodiment, it is also possible to form a construction in which a check valve (see the reference numeral 32 in FIG. 6) and the like are provided in a downstream side of the first two-way electromagnetic valve 5 to suppress variation of pressure which occurs when the high-pressure fuel is supplied.

Since the fuel injection system as the fourth embodiment of the present invention is constructed in a manner described above, its fuel injection operation will be now briefly described, for example, as follows. Incidentally, operations common with those of the first embodiment will be partially omitted in the following description.

First, when the low-pressure fuel is injected, the low-pressure fuel is supplied from the low-pressure accumulator 4 to the control chamber 11 and the fuel chamber 12 through the orifice 6a, so that the low-pressure fuel injection is conducted.

Then, when the high-pressure fuel is injected, the first two-way electromagnetic valve 5 is opened on the basis of a control signal from the controller 8, so that the high-pressure fuel is supplied from the high-pressure accumulator 3 to the control chamber 11 and the fuel chamber 12. At this time, the high-pressure fuel is supplied to the injector 9 without reverse flowing in the fuel passage 10b, so that the high-pressure fuel is injected. In other words, in this case, since the flow passage of the orifice 6a is so formed as to be sufficiently smaller in cross section than the fuel injection hole of the injector 9, the flow of the high-pressure fuel injection into the low-pressure accumulator 4 is suppressed. Namely, in this case, the orifice 6a effects the same actions as those of a check valve. Due to this, the same effects as those of the check valve are obtained.

Further, after completion of the fuel injection, the high-pressure fuel remaining in the injector 9 and the fuel passages 10a, 10c is accumulated in the low-pressure accumulator 4 through the orifice 6a before a subsequent cycle of the fuel injection starts. In other words, after completion of the fuel injection, since the fuel passage 10b is lower in pressure than each of the injector 9 and the fuel passages 10a, 10b, such remaining fuel flows gradually into the low-pressure accumulator 4 through the orifice 6a. Then, when the fuel pressure inside the injector 9 balances with that inside the low-pressure accumulator 4, the flow of fuel into this low-pressure accumulator 4 stops.

As described above, according to the fuel injection system as the fourth embodiment of the present invention, it is possible to have the high-pressure fuel remaining inside the injector 9 and the like return to the low-pressure accumulator 4 with the use of a simple construction provided with the orifice 6a serving as the flow control means 30, without draining such remaining high-pressure fuel. Consequently, an advantage is found in the fact that the system is improved in energy efficiency.

Namely, as described also in the third embodiment, in case that the high-pressure fuel remaining inside the injector 9 and the like is discharged into the fuel tank 17, since this high-pressure fuel comes to the atmospheric pressure, energy required to pressurize the fuel with the use of pump is lost.

In contrast with this, in this system, the high-pressue fuel remaining inside the injector 9 and the like is not discharged into the fuel tank 17, but stored in the low-pressure accumulator 4. Consequently, such energy described above is recovered in this system, which improves the system in energy efficiency. Incidentally, since the orifice 6a has substantially no movable part, an advantage is found in the fact that the system is improved in durability and reliability.

(5) Description of a Fifth Embodiment

Then, the fifth embodiment of the present invention will be described.

Figure 9:
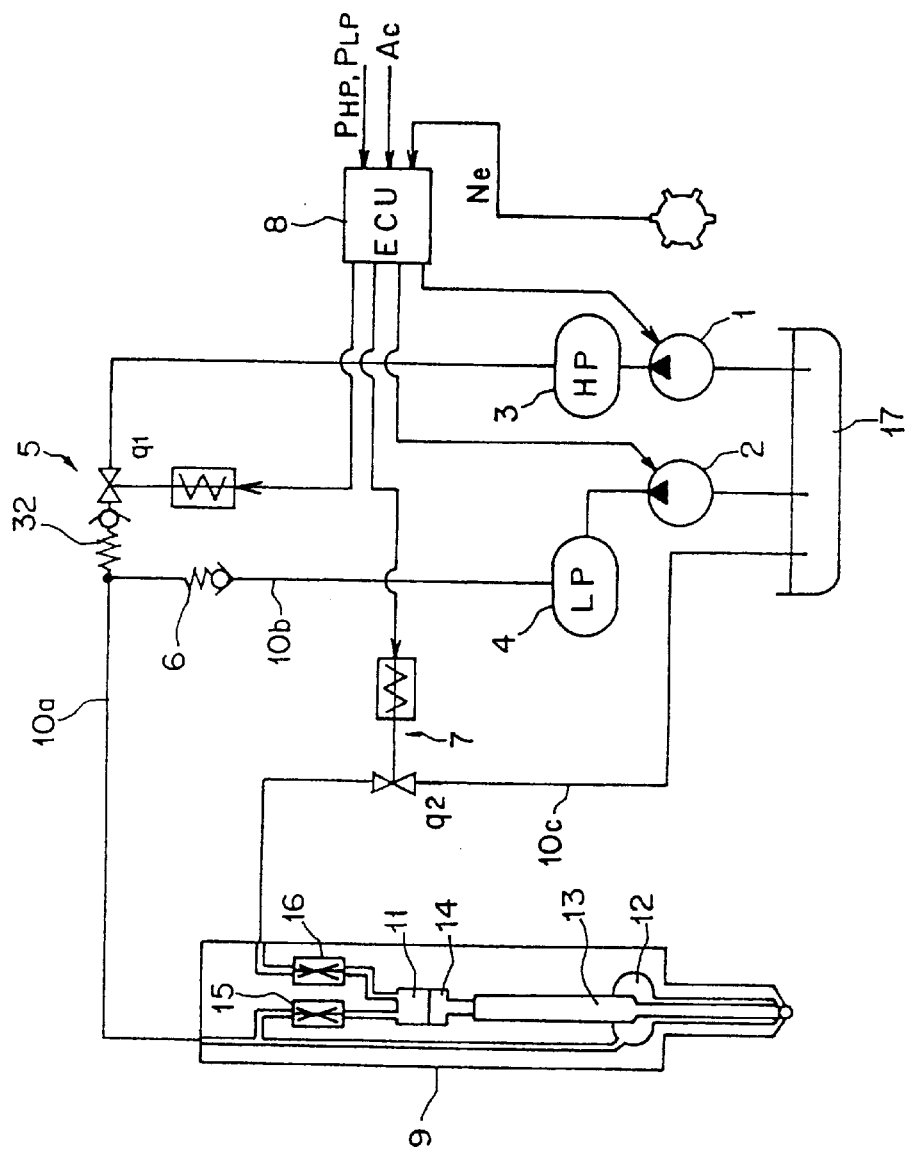
FIG. 9 is a schematic circuit diagram of the fuel injection system of a fifth embodiment of the present invention, illustrating essential parts of the system in construction.

As shown in FIG. 9, this fifth embodiment has substantially the same construction as that of the first embodiment. Consequently, like reference characters and/or numerals apply to similar parts, and are not further explained here.

First, principally, a difference between the fifth and the first embodiment will be described. The only one difference therebetween lies in the fact that: in the fifth embodiment, the check valve 32 is provided in a position which is in a downstream side of the first two-way electromagnetic valve 5 and in an upstream side of the confluence of the fuel passages 10a and 10b.

This check valve 32 is the same as that described in the third embodiment, and provided to suppress variation of pressure as much as possible, which variation of pressure occurs when the high-pressure fuel is supplied.

In other words, as described also in the third embodiment, when the first two-way electromagnetic valve 5 is opened to perform the high-pressure fuel injection, a pressure differene appears suddenly in the fuel passage 10a, thereby producing a pressure wave. The more amplitude this pressure wave gains, the more the injection wave form is disturbed.

Further, this pressure wave is reflected from the open end of the fuel injection hole of the injector 9 to produce a reflected wave between the fuel chamber 12 and the high-pressure accumulator 3. When this reflected wave reaches the high-pressure accumulator 3, variation of pressure is also produced in the high-pressure accumulator 3, which is one of the disturbing causes of the injection wave form.

When the injection wave form is largely disturbed as described above, there is a fear that smoke is discharged and the fuel consumption becomes worse. In other words, when such variation of pressure is produced in the high-pressure fuel injection to disturb the injection wave form, it is difficult to effectively atomize the fuel in the cylinder, which fuel is injected at a time when the fuel injection pressure is in a low level, so that a combustion state of the fuel becomes unstable, whereby the smoke is discharged and the fuel consumption becomes worse.

Consequently, in this embodiment, in order to minimize the influence upon the injection wave form by suppressing such variation of pressure as much as possible, there is provided the check valve 32. More particularly, in this embodiment, by providing the check valve 32 in the downstream side of the first two-way electromagnetic valve 5, it is possible to suppress such sudden variation of pressure occurring in the fuel passage 10a. This is because the check valve 32 serves as a flow passage resistance. Further, since the sudden variation of pressure is suppressed, the amplitude of the pressure wave produced when the first two-way electromagnetic valve 5 is opened becomes smaller, so that the disturbance of the fuel injection wave form is suppressed.

Further, when the first two-way electromagnetic valve 5 is switched into its ON condition, though the pressure wave of the high-pressure fuel is reflected from the open end of the fuel injection hole of the injector 9, the propagation of such reflected wave from the open end of the fuel injection hole of the injector 9 to the high-pressure accumulator 3 may be blocked-off by the provision of the check valve 32, which makes it possible to eliminate the influence of the reflected wave upon the fuel injection.

Consequently, the variation of pressure in the fuel chamber 12 is also suppressed, which makes it possible to suppress the disturbance of the injection wave form and to obtain a stable pattern of the injection wave form (see FIG. 7).

The fuel injection system as the fifth embodiment of the present invention is constructed in such a manner as described above, and, therefore operates in the high-pressure fuel injection cycle as follows.

After the elapse of a predetermined period of time after the low-pressure fuel injection starts, the first two-way electromagnetic valve 5 is switched from its OFF condition into its ON condition, so that the high-pressure fuel in the high-pressure accumulator 3 is supplied to the side of the injector 9. At this time, by supplying the high-pressure fuel through the check valve 32, the sudden variation of pressure occurring in the fuel passage 10a is suppressed. In other words, by supplying the high-pressure fuel through the check valve 32, the variation of pressure occurring in the fuel passage 10a becomes relatively milder.

Consequently, the amplitude of the pressure wave reaching the fuel chamber 12 becomes smaller, so that the variation of pressure in the fuel chamber 12 is suppressed. Further, since the variation of pressure in the fuel chamber 12 is suppressed, the disturbance of the fuel injection wave form is also suppressed.

Further, although such pressure wave is reflected from the open end of the fuel injection hole of the injector 9 to produce the reflected wave, the propagation of such reflected wave from the side of the fuel chamber 12 to the high-pressure accumulator 3 is blocked-off by the check valve 32, so that the influence of this reflected wave is removed as mush as possible.

Due to this, the variation of pressure in the fuel chamber 12 is suppressed, so that the high-pressure fuel injection is performed with a stable pattern of the injection wave form (see FIG. 7).

Consequently, according to this system, it is possible to realize a stable state of the fuel injection in addition to the advantages of the first and the second embodiments, and an advantage is found in the fact that the engine may keep its combustion cycle good to suppress the discharge of smoke and may improve its fuel consumption and its power output.

(6) Description of a Sixth Embodiment

Then, the sixth embodiment of the present invention will be described.

Figure 10:
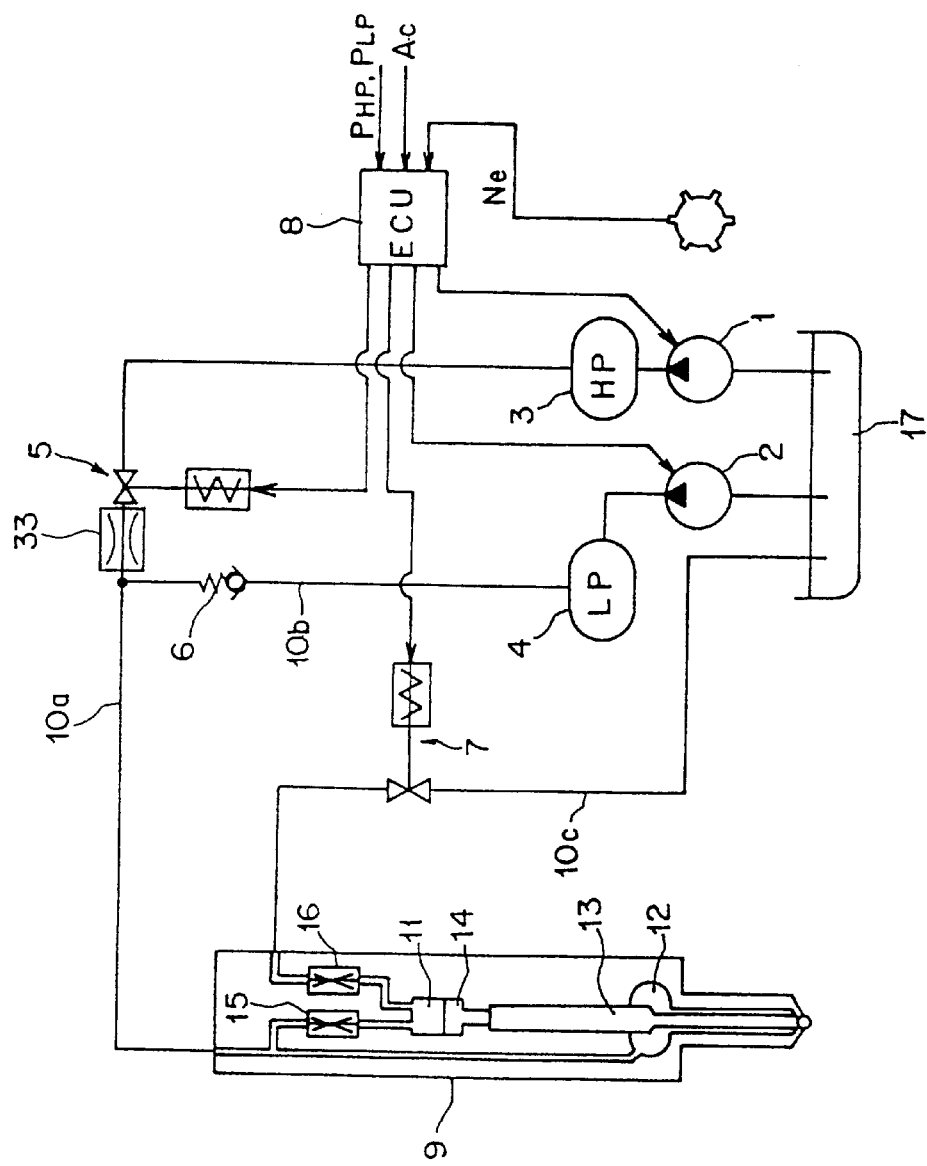
FIG. 10 is a schematic circuit diagram of the fuel injection system of a sixth embodiment of the present invention, illustrating essential parts of the system in construction.

As shown in FIG. 10, this sixth embodiment has substantially the same construction as those of the first and the fifth embodiment. Consequently, like reference characters and/or numerals apply to similar parts, and are not further explained here.

As shown in FIG. 10, this sixth embodiment has the same construction as that of the first embodiment except that: in the sixth embodiment, an orifice 33 is provided in a downstream side of the first two-way electromagnetic valve 5. In other words, this embodiment has a construction in which the orifice 33 is provided in place of the check valve 32 (see FIG. 9) of the fifth embodiment.

The reason why the orifice 33 is provided is that: as is in the fifth embodiment, it is necessary to suppress a disturbance in the fuel injection rate caused by the variation of pressure occurring in the high-pressure fuel injection cycle.

Figure 11A:
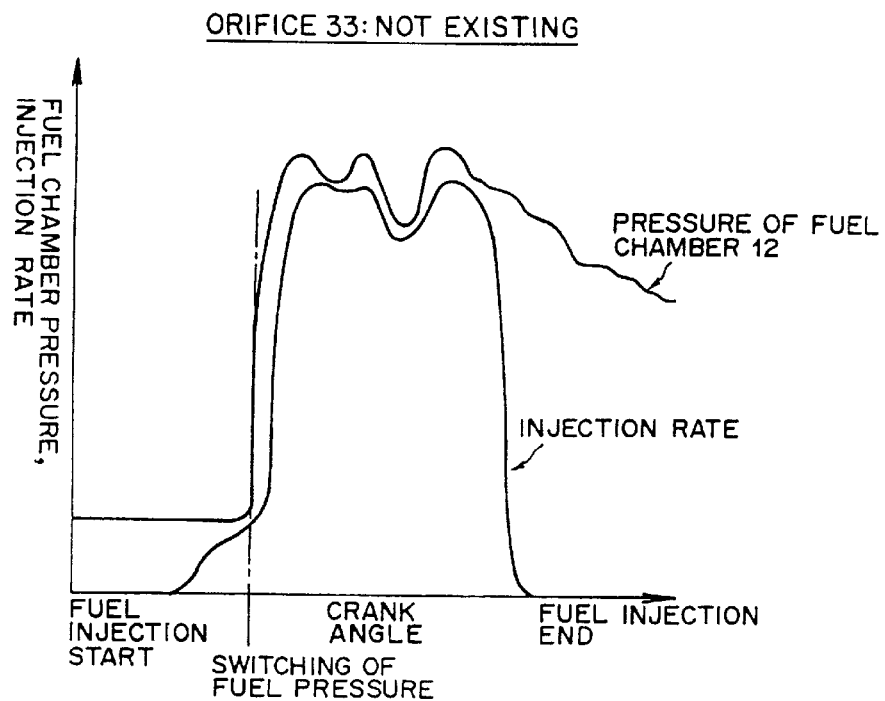
FIG. 11($a$) is a diagram showing in operation the sixth embodiment of the present invention, illustrating both the injection rate in the system and characteristics in pressure of the fuel chamber of the injector when the flow control means is not provided.

More specifically, when the first two-way electromagnetic valve 5 is opened to perform the high-pressure fuel injection, a sudden variation of pressure appears in the fuel passage 10a, thereby producing a pressure wave. Due to this pressure wave, as shown in FIG. 11(a), the fuel pressure in the fuel chamber 12 varies largely. Further, the more amplitude this pressure wave gains, i.e., the more the variation of pressure in the fuel chamber 12 varies, the more the pattern of the injection wave form is disturbed.

Further, as already described in the above, when the reflected wave, which is produced when the pressure wave is reflected, reaches the high-pressure accumulator 3, variation of pressure appears also in the high-pressure accumulator 3, which is one of the disturbing causes of the injection wave form.

Therefore, in this embodiment, in order to suppress such variation of pressure to minimize its influence exerted upon the injection wave form, there is provided the orifice 33. In other words, in this embodiment, by providing the orifice 33 in a downstream side of the first two-way electromagnetic valve 5, it is possible to suppress a rapid variation of pressure occurring in the fuel passage 10a when the passage 10a suppies the high-pressure fuel. This is because the orifice 33 serves as a flow passage resistance, or because the orifice 33 operates substantially in the same manner as that of the check valve 32 of the fifth embodiment (see FIG. 9).

Figure 11B:
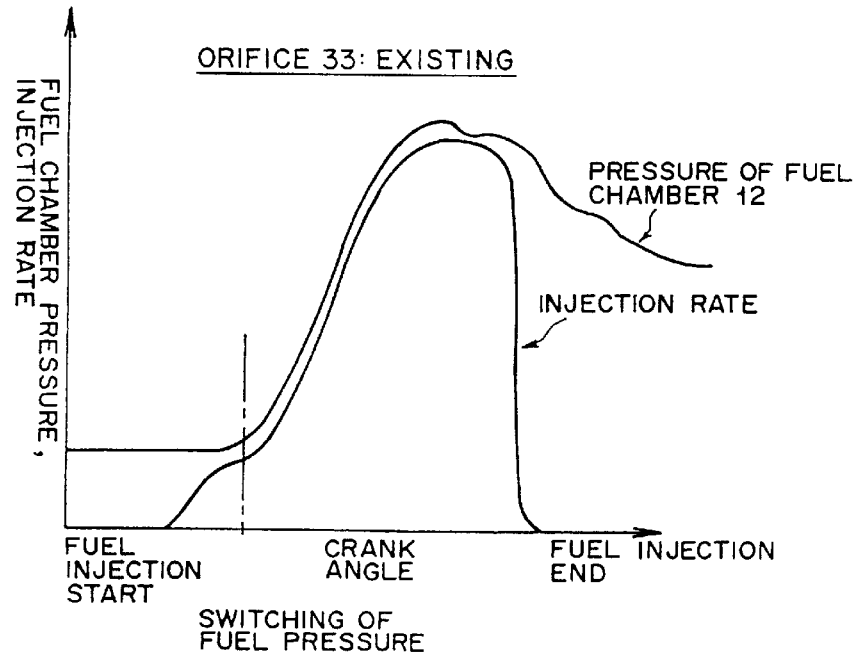
Figure 12:
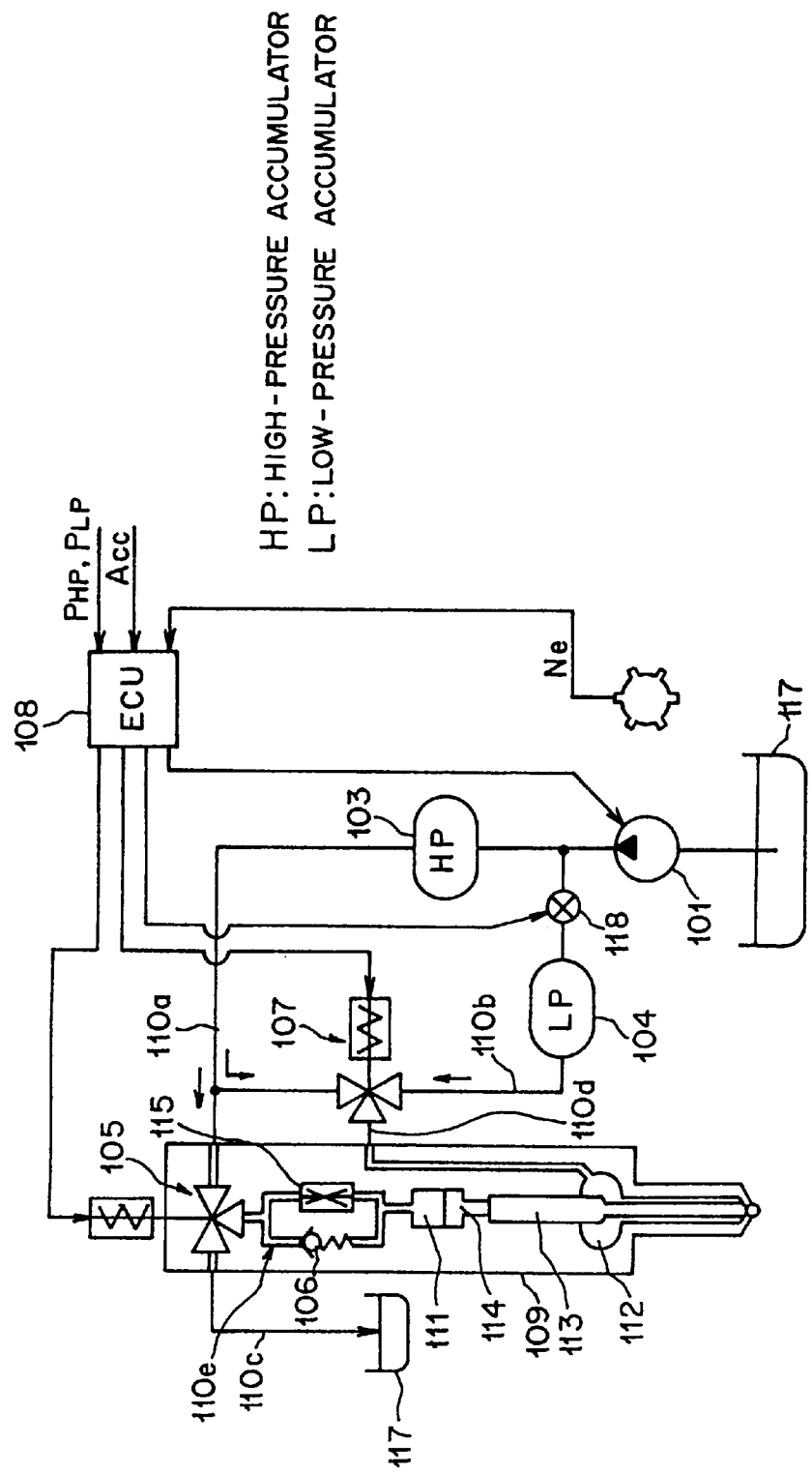

Consequently, as shown in FIG. 11(b), the variation of pressure appearing in the fuel chamber 12 when the high-pressure fuel is injected is suppressed. Further, since the sudden variation of pressure is suppressed, the amplitude of the pressure wave appearing when the first two-way electromagnetic valve 5 is opened becomes smaller, so that a disturbance in the pattern of the fuel injection wave form is also suppressed.

Incidentally, the flow passage of the orifice 33 is so formed as to be larger in cross section than the sum of the fuel injection hole of the injector 9 and the flow passage of the orifice 15. This is because: when the flow passage of the orifice 33 is so formed as to be smaller in cross section than the sum of the fuel injection hole of the injector 9 and the flow passage of the orifice 15, the fuel supplied through the orifice 33 in the high-pressure fuel injection cycle is smaller in amount than that injected through the injector 9, which makes it impossible to obtain a desired fuel injection rate.

On the other hand, when the flow passage of the orifice 33 is excessively enlarged in cross section, it becomes impossible to sufficiently suppress the variation of pressure when the high-prsessure fuel is injected. Consequently, in order to suppress the variation of pressure, it is preferable to set the flow passage of the orifice 33 so as to be the smallest possible size, provided that the size is larger in cross section than the sum of the fuel injection hole of the injector 9 and the flow passage of the orifice 15.

In other words, as for only the purpose of suppressing the variation of pressure, it suffices to set the flow passage of the orifice 33 so as to be equal in cross section to the sum of the fuel injection hole of the injector 9 and the flow passage of the orifice 15. In this case, with respect to a predetermined injection pressure, it is possible to perform the injection without any drop in the injection pressure. It is natural that the flow passage of the orifice 33 is not limited in cross section to this size, and may be set in consideration of the fuel pressure, the time duration of the fuel injection, viscosities of the fuel, and like conditions, provided that the flow passage of the orifice 33 is so formed as to be larger in cross section than the sum of the fuel injection hole of the injector 9 and the flow passage of the orifice 15.

The fuel injection system as the sixth embodiment of the present invention is constructed in such a manner as described above, and, therefore has substantially the same actions and effects as those described in the fifth embodiment.

In other words, after the elapse of a predetermined period of time after the low-pressure fuel injection starts, the first two-way electromagnetic valve 5 is switched from its OFF condition into its ON condition, so that the high-pressure fuel in the high-pressure accumulator 3 is supplied to the side of the injector 9. At this time, by supplying the high-pressure fuel through the orifice 33, the sudden variation of pressure appearing in the fuel passage 10a is suppressed. Namely, by supplying the high-pressure fuel through the orifice 33, the variation of pressure in the fuel passage 10a becomes relatively milder.

Consequently, the amplitude of the pressure wave reaching the fuel chamber 12 becomes smaller, so that the variation of pressure in the fuel chamber 12 is suppressed, as shown in FIG. 11(b). Further, since the variation of pressure in the fuel chamber 12 is suppressed, the disturbance in the pattern of the fuel injection wave form is also suppressed.

Further, the propagation of the reflected wave from the open end of the fuel injection hole of the injector 9 to the high-pressure accumulator 3 is blocked-off by the orifice 33, so that the influence of the reflected wave is removed as much as possible.

Due to this, the variation of pressure in the fuel chamber 12 is suppressed, which makes it possible to perform the high-pressure fuel injection with a stable pattern of the injection wave form.

As described above, according to this system, the same advantages as those of the fifth embodiment described above are obtained. Further, since the orifice 33 has substantially no movable part, the system is improved in reliability and durability.

(7) Others

Although the first to the sixth embodiments have been described in the above as embodiments of the present invention, the embodiments of the present invention are not limited to the above six embodiments only. In other words, within the scope of the present invention not departing from its gist, various modifications may be accomplished. Further, different constructions of the first to the sixth embodiments may be combined with each other. For example, it is also possible to form a construction in which: the check valve 32 (see FIG. 6) in the second embodiment may be replaced with the orifice 33.

Applicability in Industry

By applying the present invention to a fuel injection system of an internal combustion engine, it is possible to reduce the discharge of smoke and particulates to a large extent, thereby improving the internal combustion engine in fuel consumption and power output. Further, an advantage is found in the fact that: it is also possible to simplify in construction the fuel injection system itself, thereby realizing a considerable cost reduction. Consequently, it is considered that the present invention is excellent in utility.

What is claimed is:

1. A fuel injection system comprising:
   a first accumulator for storing high-pressure fuel therein;
   a second accumulator for storing low-pressure fuel sufficiently lower in pressure than said fuel stored in said first accumulator;
   a first two-way electromagnetic valve disposed in a first fuel passage connecting said first accumulator with a fuel injection nozzle;
   a flow control means for controlling a flow rate of fuel passing through a second fuel passage connecting a downstream side of said first two-way electromagnetic valve in said first fuel passage with said second accumulator, said flow control means being disposed in said second fuel passage;

a second two-way electromagnetic valve disposed in a fuel return passage connecting said fuel injection nozzle with the fuel tank, said second two-way electromagnetic valve switching the fuel injection modes of said fuel from its injection mode to its non-injection mode or vice versa; and a control means for controlling both said first two-way electromagnetic valve and said second two-way electromagnetic valve so as to open and close them in response to engine's operating conditions.

2. The fuel injection system as claimed in claim 1, comprising:

provided in said fuel injection nozzle is a control chamber connected with each of said first fuel passage and said fuel return passage;

a first throttle means for throttling an amount of fuel entering said control chamber through said first accumulator or through said second accumulator is disposed in said first fuel passage;

a second throttle means for throttling an amount of fuel discharged from said control chamber to said fuel tank is disposed in said fuel return passage; and the degree of throttling in said first throttle means is so set as to be larger than in said second throttle means.

3. The fuel injection system as claimed in claim 1, comprising that said control means controls both said first two-way electromagnetic valve and said second two-way electromagnetic valve to open and close in a manner such that: after said second two-way electromagnetic valve is opened in a condition in which said first two-way electromagnetic valve is held closed, said first two-way electromagnetic valve is then opened in a condition in which said second two-way electromagnetic valve is held open.

4. The fuel injection system as claimed in claim 1, wherein said control means controls both said first two-way electromagnetic valve and said second two-way electromagnetic valve to open and close them in a manner such that: after said second two-way electromagnetic valve is opened in a condition in which said first two-way electromagnetic valve is held closed, said second two-way electromagnetic valve is temporarily closed, and then said first two-way electromagnetic valve and said second two-way electromagnetic valve are simultaneously opened or sequentially opened at a predetermined time interval.

5. The fuel injection system as claimed in claim 1, comprising:

further provided is a first by-pass passage connecting an upstream side of said first two-way electromagnetic valve with a downstream side of the same valve;

further provided is a second by-pass passage connecting an upstream side of said second two-way electromagnetic valve with a downstream side of the same valve;

a third throttle means and a fourth throttle means are disposed in said first by-pass passage and said second by-pass passage, respectively; and the degree of throttling in said third throttle means is so set as to be larger than in said fourth throttle means.

6. The fuel injection system as claimed in claim 1, wherein said flow control means is a check valve for only permitting the fuel to flow from said second accumulator to said fuel injection nozzle.

7. The fuel injection system as claimed in claim 1, wherein said flow control means is an orifice for throttling an amount of fuel passing through said second fuel passage.

8. The fuel injection system as claimed in claim 1, wherein said flow control means is constructed of: a check valve for only permitting the fuel to flow from said second accumulator to said fuel injection nozzle; and, said orifice for throttling an amount of fuel passing through said second fuel passage; and said check valve and said orifice are connected in parallel with each other in said second fuel passage.

9. The fuel injection system as claimed in claim 1, comprising: a check valve is disposed in a downstream side of said first two-way electromagnetic valve and in an upstream side of a junction of said first and second fuel passages, and only permits the fuel to flow from said first accumulator to said fuel injection nozzle.

10. The fuel injection system as claimed in claim 1, comprising: an orifice is disposed in a downstream side of said first two-way electromagnetic valve and in an upstream side of a junction of said first and second fuel passages, and throttles an amount of fuel passing through said first fuel passage.

11. The fuel injection system as claimed in claim 1, comprising;

a high-pressure pump is provided in an upstream side of said first accumulator to pressurize the fuel in said fuel tank to a high pressure; and a low-pressure pump is provided in an upstream side of said second accumulator to pressurize the fuel in said fuel tank to a predetermined low pressure smaller than a pressure inside said first accumulator.

12. The fuel injection system as claimed in claim 7, comprising:

a high-pressure pump is provided in an upstream side of said first accumulator to pressurize the fuel in said fuel tank to a high pressure; and a relief valve is provided between said second accumulator and said fuel tank to keep the fuel of said second accumulator at a predetermined pressure.

13. The fuel injection system as claimed in claim 8, comprising:

a high-pressure pump is provided in an upstream side of said first accumulator to pressurize the fuel in said fuel tank to a high pressure; and a relief valve is provided between said second accumulator and said fuel tank to keep the fuel of said second accumulator at a predetermined pressure.

14. The fuel injection system as claimed in claim 2, comprising that said control means controls both said first two-way electromagnetic valve and said second two-way electromagnetic valve to open and close in a manner such that: after said second two-way electromagnetic valve is opened in a condition in which said first two-way electromagnetic valve is held closed, said first two-way electromagnetic valve is then opened in a condition in which said second two-way electromagnetic valve is held open.

15. The fuel injection system as claimed in claim 2, wherein said control means controls both said first two-way electromagnetic valve and said second two-way electromagnetic valve to open and close them in a manner such that: after said second two-way electromagnetic valve is opened in a condition in which said first two-way electromagnetic valve is held closed, said second two-way electromagnetic valve is temporarily closed, and then said first two-way electromagnetic valve and said second two-way electromagnetic valve are simultaneously opened or sequentially opened at a predetermined time interval.

16. The fuel injection system as claimed in claim 2, comprising:

further provided is a first by-pass passage connecting an upstream side of said first two-way electromagnetic valve with a downstream side of the same valve;

further provided is a second by-pass passage connecting an upstream side of said second two-way electromagnetic valve with a downstream side of the same valve;

a third throttle means and a fourth throttle means are disposed in said first by-pass passage and said second by-pass passage, respectively; and the degree of throttling in said third throttle means is so set as to be larger than in said fourth throttle means.

17. The fuel injection system as claimed in claim 2, wherein said flow control means is a check valve for only permitting the fuel to flow from said second accumulator to said fuel injection nozzle.

18. The fuel injection system as claimed in claim 2, wherein said flow control means is an orifice for throttling an amount of fuel passing through said second fuel passage.

19. The fuel injection system as claimed in claim 2, wherein said flow control means is constructed of: a check valve for only permitting the fuel to flow from said second accumulator to said fuel injection nozzle; and, said orifice for throttling an amount of fuel passing through said second fuel passage; and said check valve and said orifice are connected in parallel with each other in said second fuel passage.

20. The fuel injection system as claimed in claim 2, comprising: a check valve is disposed in a downstream side of said first two-way electromagnetic valve and in an upstream side of a junction of said first and second fuel passages, and only permits the fuel to flow from said first accumulator to said fuel injection nozzle.

21. The fuel injection system as claimed in claim 2, comprising: an orifice is disposed in a downstream side of said first two-way electromagnetic valve and in an upstream side of a junction of said first and second fuel passages, and throttles an amount of fuel passing through said first fuel passage.

22. The fuel injection system as claimed in claim 2, comprising;

a high pressure pump is provided in an upstream side of said first accumulator to pressurize the fuel in said fuel tank to a high pressure; and a low-pressure pump is provided in an upstream side of said second accumulator to pressurize the fuel in said fuel tank to a predetermined low pressure smaller than a pressure inside said first accumulator.

23. The fuel injection system as claimed in claim 18, comprising:

a high-pressure pump is provided in an upstream side of said first accumulator to pressurize the fuel in said fuel tank to a high pressure; and a relief valve is provided between said second accumulator and said fuel tank to keep the fuel of said second accumulator at a predetermined pressure.

24. The fuel injection system as claimed in claim 19, comprising:

a high-pressure pump is provided in an upstream side of said first accumulator to pressurize the fuel in said fuel tank to a high pressure; and a relief valve is provided between said second accumulator and said fuel tank to keep the fuel of said second accumulator at a predetermined pressure.

* * * * *